(12) United States Patent
Kuwahara et al.

(10) Patent No.: US 8,246,463 B2
(45) Date of Patent: Aug. 21, 2012

(54) GAME SYSTEM AND GAME APPARATUS

(75) Inventors: Masato Kuwahara, Kyoto (JP); Shoya Tanaka, Kyoto (JP); Teruyuki Yoshioka, Kyoto (JP); Toru Oe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 316 days.

(21) Appl. No.: 11/038,395

(22) Filed: Jan. 21, 2005

(65) Prior Publication Data

US 2005/0181877 A1 Aug. 18, 2005

(30) Foreign Application Priority Data

Jan. 20, 2004 (JP) .................................. 2004-012459

(51) Int. Cl.
*A63F 9/24* (2006.01)
*A63F 13/00* (2006.01)
*G06F 17/00* (2006.01)
*G06F 19/00* (2011.01)

(52) U.S. Cl. ................................ 463/42; 463/39; 463/40

(58) Field of Classification Search .................... 463/31, 463/40, 42, 43, 9
See application file for complete search history.

(56) References Cited

U.S. PATENT DOCUMENTS

| | | | | |
|---|---|---|---|---|
| 4,958,835 A * | 9/1990 | Tashiro et al. | | 463/42 |
| 5,618,045 A * | 4/1997 | Kagan et al. | | 463/40 |
| 5,816,920 A * | 10/1998 | Hanai | | 463/42 |
| 5,828,843 A * | 10/1998 | Grimm et al. | | 709/228 |
| 6,171,186 B1 * | 1/2001 | Kurosawa et al. | | 463/31 |
| 6,524,189 B1 | 2/2003 | Rautila | | |
| 6,699,125 B2 * | 3/2004 | Kirmse et al. | | 463/42 |
| 7,134,961 B2 * | 11/2006 | Hora | | 463/42 |
| 2002/0142842 A1 * | 10/2002 | Easley et al. | | 463/42 |
| 2004/0002384 A1 * | 1/2004 | Multerer et al. | | 463/42 |
| 2004/0180718 A1 * | 9/2004 | Uchida et al. | | 463/31 |

FOREIGN PATENT DOCUMENTS

| | | |
|---|---|---|
| JP | 2000-135380 | 5/2000 |
| JP | 2000-262749 | 9/2000 |
| JP | 2001-87561 | 4/2001 |

OTHER PUBLICATIONS

Gamespy, "Gamespy Arcade," Dec. 5, 2000, http://www.gamespyarcade.com/features/versions.shtml.*
Screenshot of Gamespy Arcade, http://clan-trmn8z.tripod.com/sitebuildercontent/sitebuilderpictures/picture001111.jpg.*
Dynamix, "Tribes 2," Mar. 21, 2001, Sierra On-Line, Game Manual.*
Minh Le and Jess Cliffe, "Counter-Strike", Jun. 12, 1999 to Sep. 15, 2003, Valve Software, http://www.csextreme.net/features/tracker/tracker.asp.*

* cited by examiner

*Primary Examiner* — Dmitry Suhol
*Assistant Examiner* — Kevin Y Kim
(74) *Attorney, Agent, or Firm* — Nixon & Vanderhye PC

(57) ABSTRACT

According to a game system and a game apparatus of the present invention, when other game apparatus or a group to which a plurality of game apparatuses belong are present in a range where wireless communication by the game apparatus operated by a player is available, the other game apparatus and the makeup of the group are notified to the player. Thus, the player can form a group of desired game apparatuses by determining a group to enter in consideration of the displayed group information, and execute a multiplayer game using wireless communication.

26 Claims, 32 Drawing Sheets

GROUP INFORMATION REQUEST FRAME

F I G. 20

GROUP INFORMATION RESPONSE FRAME

| F_TYP | E F | DESTINATION ID | TRANSMISSION SOURCE ID | GROUP INFORMATION |
|---|---|---|---|---|

F I G. 2 1

ENTRY REQUEST FRAME

| F_TYP | DESTINATION ID | TRANSMISSION SOURCE ID | TRANSMISSION SOURCE USER NAME |
|---|---|---|---|

FIG. 22

ENTRY RESPONSE FRAME

| F_TYP | DESTINATION ID | TRANSMISSION SOURCE ID | RESULT | GROUP INFORMATION |

F I G. 2 3

ENTRY CANCEL NOTIFICATION FRAME

| F_TYP | DESTINATION ID | TRANSMISSION SOURCE ID |
|---|---|---|

GAME START REQUEST FRAME

F I G. 2 5
GAME START RESPONSE FRAME
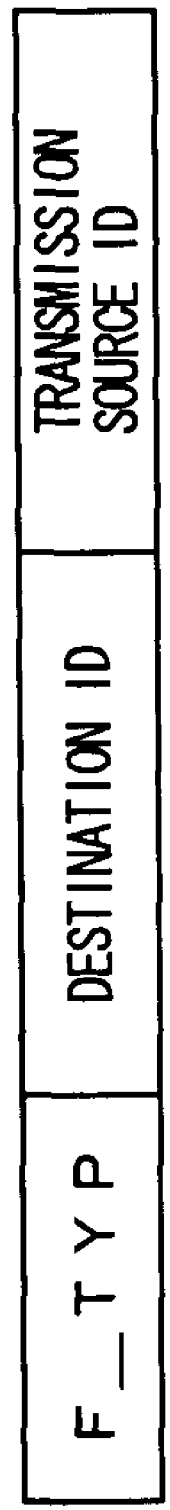

F I G. 2 6
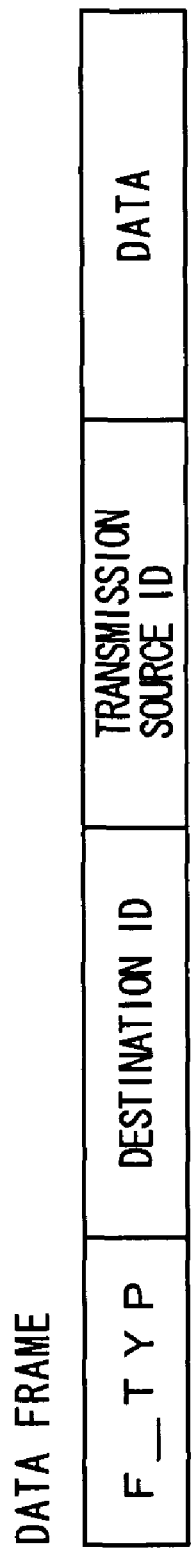

F I G. 3 1
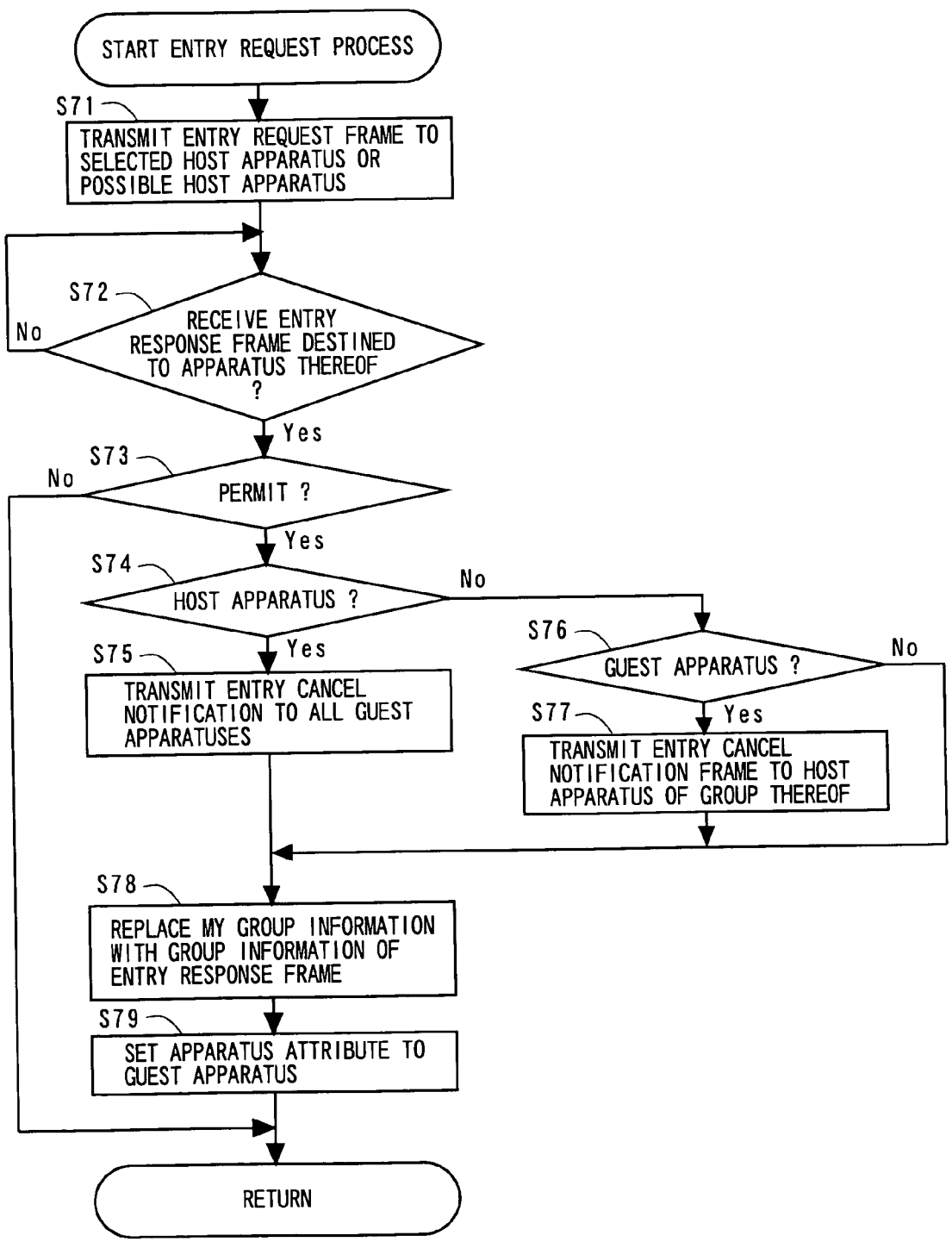

GAME SYSTEM AND GAME APPARATUS

This application claims priority to Japanese Application 2004-012459 filed Jan. 20, 2004, the entire contents of which are hereby incorporates by reference.

FIELD

The illustrative embodiments relate to game systems and game apparatuses which perform wireless communication between a plurality of game apparatuses, more particularly, relates to a game system and a game apparatus which form a group of a plurality of game apparatuses to play a game by performing wireless communication within the group.

BACKGROUND AND SUMMARY

Conventionally, as disclosed in Japanese Laid-Open Patent Publication No. 2000-135380, for example, a game apparatus for playing a game by performing short distance wireless communication between a plurality of game apparatuses has been known. In a technique as disclosed in the above gazette, a time period in which communication data is transmitted/received is assigned based on a time at which the communication data is transmitted from a reference game apparatus, and a plurality of game apparatuses each perform wireless communication according to the assigned time period.

For instance, in the game apparatus as disclosed in Japanese Laid-Open Patent Publication No. 2000-135380, a time period corresponding to one cycle is divided into four slots S1 to S4, and four cycle channels are assigned to these slots. Specifically, as an assigned time period, four channels A1 to A4, four channels B1 to B4, four channels C1 to C4, and four channels D1 to D4 are assigned to the slot S1, the slot S2, the slot S3, and the slot S4, respectively. In this example, setting is performed such that channel systems of the slots are different from each other by assigning channels belonging to the same system to each slot.

In the case where there are a plurality of groups of game apparatuses playing a game while performing wireless communication, which are located close to each other, for example, the above groups are assigned with channels belonging to different systems. As a result, the game apparatuses of each group can transmit/receive game communication data without causing interference with other game apparatus of other group.

According to a portable game apparatus for playing a game while directly exchanging data with other game apparatus by utilizing short distance wireless communication (i.e., not via a server, etc.), it is possible to play a multiplayer game with a total stranger in a place where a lot of people frequent (e.g., in the train or on the street). A player having a particular portable game apparatus transmits a play request to other portable game apparatuses present in communication range. Then the player forms a group by obtaining permission to play with from the other portable game apparatuses, whereby it is possible to determine a group (of players) in which a multiplayer game is played.

However, if more than one player is seeking other players to play with, those players may not be able to form a desired group. For instance, assume that four portable game apparatuses a to d are present in a communication range, and a player A of the portable game apparatus a desires to play a multiplayer game in a group of four players. In this situation, if the player A transmits a play request to the portable game apparatus b, and a player C of the portable game apparatus c transmits a play request to the portable game apparatus d, there will be two groups of two players. When the players are friends with each other and a the wireless communication is available is relatively narrow, meaning the players must be in close proximity, the players may be able to form a desired group by discussing verbally. However, it would be difficult to have a verbal discussion when the range where short distance wireless communication is available is relatively wide. Also, when a multiplayer game is executed via a server, the server can adjust the group formation. However, it would be difficult when each game apparatus performs communication by short distance wireless communication without utilizing the server. A technique about grouping desired by the player is not readily disclosed in Japanese Laid-Open Patent Publication No. 2000-135380.

In addition to that, when the above two groups of two players are formed, the portable game apparatus a is not able to detect the presence of other group, it can only check the makeup of its own group. As a result, once two groups of two players are formed, it is impossible to reorganize those two groups into one group of four players. Only if the player A of the portable game apparatus a can detect the presence of another group, (a group of game apparatuses E, F, and G of three players, for example) can the player A form a group of four players by issuing a play request to the group. In reality, however, the player A cannot check the makeup of another group, and may find it difficult to form a desired group.

According to one aspect, the illustrative embodiments are capable of providing a game system and a game apparatus which are capable of forming a group desired by a player and executing a multiplayer game (notes in parentheses indicate exemplary elements which can be found in the embodiments to follow, though such notes are not intended to limit the scope of the invention).

An illustrative exemplary game system may include a plurality of game apparatuses (1) which execute a multiplayer game by directly exchanging data therebetween by using wireless communication. Each illustrative exemplary game apparatus may comprise display means (21), wireless communication means (3), group setting means (S10, S39), group information exchange means (S29, S31 to S37), display control means (S7, S12), selection means (22, S8, S13), group changing means (S10, S78, S96), and multiplayer game execution means (11). The wireless communication means directly transmits and receives data to and from other game apparatuses (1). The group setting means sets a game apparatus group, to which one of the plurality of game apparatuses including the game group setting means and other game apparatus belongs (MY group), by exchanging group formation data with the other game apparatus via the wireless communication means. The group information exchange means exchanges group information (14*a*) on group formation of the game apparatus group, to which the one game apparatus belongs, with other game apparatuses via wireless communication means (group information response frame). The display control means displays at least information (14*d*) on group formation of a game apparatus group, to which the one game apparatus does not belong (OTHER group,) on the display means, based on the group information received by the group information exchange means (e.g., FIG. 9). The selection means allows a player to select to enter any of the game apparatus groups displayed on the display means by the display control means. These groups are indicated by the displayed information on group formation of the game apparatus group to which the one game apparatus does not belong. When selection by the selection means is performed (YES at S9 and S14), the group changing means exchanges group formation data, via the wireless communication means, with a game apparatus belonging to the selected game apparatus group and adds the selecting game apparatus to the selected game apparatus group. The multiplayer game execution means executes a multiplayer game in the game apparatus group set by the group setting means and the group changing means.

The group information may include identification information (14a5, 14a6) on all game apparatuses belonging to the game apparatus group indicated by the group information. In this case, the display control means displays, as information on group formation of the game apparatus group to which the one game apparatus does not belong, the makeup of the game apparatus group on the display means.

Also, the display control means may further display, on the display means, at least information on group formation of the game apparatus group to which displaying game apparatus belongs. This information may be based on the group information set by the group setting means or the group changing means.

The group information exchange means may exchange the group information with other game apparatuses at regular intervals (S22).

Each game apparatus may further comprise entry request means (S71) and entry response means (S98, S99). When selection by the selection means is performed, the entry request means transmits an entry request via the wireless communication means to the grouped game apparatus belonging to the selected game apparatus group (entry request frame). When the entry request to the game apparatus group to which the grouped game apparatus belongs is received from requesting game apparatus via the wireless communication means (YES at S38), the entry response means transmits an entry permit (entry response frame) to the requesting game apparatus if the entry request is permitted (YES at S93) (S98). In this case, when the entry permit is transmitted, the group changing means adds the game apparatus transmitting the entry request to the game apparatus group to which the grouped game apparatus belongs (S96). When the entry permit is received (YES at S72), the group changing means adds the requesting game apparatus to the selected game apparatus group (S78).

The game apparatus group to which a plurality of game apparatuses belong may include one host apparatus (S94) and a guest apparatus which corresponds to a remaining game apparatus (S79). In this case, the entry request means transmits an entry request to the host apparatus of the selected game apparatus group. The group changing means of the host apparatus adds the game apparatus transmitting the entry request to the game apparatus group thereof, and transmits the group information to the guest apparatus belonging to the same game apparatus group. The group changing means of the guest apparatus changes the group information thereof based on the transmitted group information. For example, transmission of the group information to other game apparatus by the group information exchange means is performed only by the game apparatus set as a host apparatus (YES at S26). Also, as another example, when the guest apparatus moves outside a range where wireless communication with the host apparatus is available, the host apparatus removes the guest apparatus from the game apparatus group.

When the entry permit is received by the group changing means and a change to the selected game apparatus group is completed, the host apparatus transmits an entry cancel notification to all guest apparatuses belonging to the game apparatus group to which the host apparatus belongs (entry cancel notification frame).

Also, when the entry permit is received by the group changing means and a change to the selected game apparatus group is completed, the guest apparatus transmits an entry cancel notification to the host apparatus of the game apparatus group to which the guest apparatus belonged. The host apparatus which receives the entry cancel notification performs an entry cancellation and transmits the changed group information to all guest apparatuses belonging to the same game apparatus group.

Also, the game apparatus may repeat exchange of the group information using the group information exchange means. It may repeat display at least information on group formation of the game apparatus group, to which the one game apparatus does not belong, using the display control means. It may further repeat selection of the game apparatus group using the selection means and change of the game apparatus group to which the one game apparatus belongs, using the group changing means. These processes may continue until the multiplayer game execution means decides to start the multiplayer game.

An illustrative exemplary game apparatus executes a multiplayer game by directly exchanging data with other game apparatus by using wireless communication. The game apparatus comprises display means, wireless communication means, group setting means, group information exchange means, display control means, selection means, group changing means, and multiplayer game execution means. The wireless communication means directly transmits and receives data to and from other game apparatus. The group setting means sets a game apparatus group, to which the game apparatus and other game apparatuses belong, by exchanging group formation data with the other game apparatuses via the wireless communication means. The group information exchange means exchanges group information on group formation of the game apparatus group to which the game apparatus belongs with other game apparatuses via wireless communication means. The display control means displays at least information on group formation of a game group to which the game apparatus does not belong on the display means, based on the group information received by the group information exchange means. The selection means allows a player to select any of the game apparatus groups for entry. This selection can be made from any of the game apparatus groups to which the game apparatus does not belong, indicated by the information on group formation of the game apparatus group and displayed on the display means by the display control means. When selection by the selection means is performed, the group changing means exchanges the group formation data via the wireless communication means with a game apparatus belonging to the selected game apparatus group, and adds the requesting game apparatus to the selected game apparatus group. The multiplayer game execution means executes a multiplayer game in the game apparatus group set by the group setting means and the group changing means.

The group information may include identification information on all game apparatuses belonging to the game apparatus group indicated by the group information. In this case, the display control means displays, as information on group formation of the game apparatus group to which the game apparatus does not belong, the makeup of the game apparatus group on the display means.

Also, the display control means may further display, on the display means, information on group formation of the game apparatus group to which the game apparatus belongs. This information is based on the group information set by the group setting means or the group changing means.

The group information exchange means may exchange the group information with other game apparatuses at regular intervals.

Entry request means and entry response means may be further included. When selection by the selection means is performed, the entry request means transmits an entry request via the wireless communication means to the grouped game apparatus belonging to the selected game apparatus group. When the entry request to the game apparatus group to which the grouped game apparatus belongs is received from the requesting game apparatus via the wireless communication means, the entry response means transmits an entry permit to the requesting game apparatus in the case where the entry request is permitted. In this case, when the entry permit is transmitted, the group changing means adds the requesting game apparatus to the game apparatus group to which the grouped game apparatus belongs. When the entry permit is received, the group changing means adds the requesting game apparatus to the selected game apparatus group.

When the entry permit is received by the group changing means and a change to the selected game apparatus group is completed, an entry cancel notification may be transmitted to other game apparatuses belonging to the game apparatus group that the requesting game apparatus has joined.

Also, the game apparatus may repeat exchange of the group information using the group information exchange means. It may repeat display at least information on group formation of the game apparatus group, to which the one game apparatus does not belong, using the display control means. It may further repeat selection of the game apparatus group using the selection means and change of the game apparatus group to which the one game apparatus belongs, using the group changing means. These processes may continue until the multiplayer game execution means decides to start the multiplayer game.

In one illustrative exemplary game system, when a group for a multiplayer game is formed in the game system for executing the multiplayer game while directly exchanging data between the game apparatuses, a changeable group is formed by referring to the information on other groups. Thus, it is possible to form a group desired by the player.

Also, in the case where the makeup of another group is displayed, the player is notified of the makeup of a group to which the player does not belong. For example, in the case where a second group to which three game apparatuses belong is present in the neighborhood of a first group to which two game apparatuses, including the game apparatus of the player, belong, the player is notified of at least the makeup of the second group (e.g., the number of game apparatuses belonging to the group). Thus, the player belonging to the first group can opt to enter a group consisting of more players (i.e., four players) by changing groups to the second group.

Further, in the case where information on the game apparatus group to which the player belongs is also displayed, the player can be notified of the makeup of various groups including the group to which that player belongs. For example, in the case where a second group to which three game apparatuses belong is present in the neighborhood of a first group to which two game apparatuses belong, the player is notified of makeup of the first and second groups. Thus, the player belonging to the first group can opt to enter the group consisting of more players by changing groups to the second group, as a result of comparison with other group.

Also, in the case where group information is exchanged with other game apparatuses at regular intervals, the game apparatus can obtain the group information at regular intervals. Furthermore, in the case where the group information is broadcast, the game apparatus can obtain the group information in a range where wireless communication is available.

Also, in the case where the entry request means and the entry response means are included, it is possible to decide which group to enter at the player's request. In this case, grouping situations vary constantly. However, the player is continuously notified of information on the group changes, and the player can further change the selected group to enter based on such information. Thus, it is possible to increase the possibility that each player can form a desired group.

Also, in the case where a host apparatus and a guest apparatus are set in the game apparatus group, it is possible to effectively perform management of group information in the game apparatus group and group formation control, such as fixing of the group.

Also, each player of the game apparatus dynamically changes a temporary group voluntarily while exchanging temporary group information until the game starts, whereby each player of the game apparatus can form a desired group. Even if the players who don't know each other, or the players who know each other, but are located in different places, cannot perform grouping while consulting with each other, each player can form a group in which his/her desired grouping is reasonably reflected by gradually changing a selected group while checking the temporary group information.

These and other aspects of the illustrative embodiments will become more apparent from the following detailed description of the illustrative embodiments when taken in conjunction with the accompanying drawings.

BRIEF DESCRIPTION OF THE DRAWINGS

FIG. 20 is an illustration showing one example of a group information response frame;

FIG. 21 is an illustration showing one example of an entry request frame;

FIG. 22 is an illustration showing one example of an entry response frame;

FIG. 23 is an illustration showing one example of an entry cancellation frame;

FIG. 25 is an illustration showing one example of a game start response frame;

FIG. 26 is an illustration showing one example of a data frame;

FIG. 31 is a subroutine showing a detailed procedure of step S10 of FIG. 28.

DESCRIPTION OF THE ILLUSTRATIVE EMBODIMENTS

Figure 1:
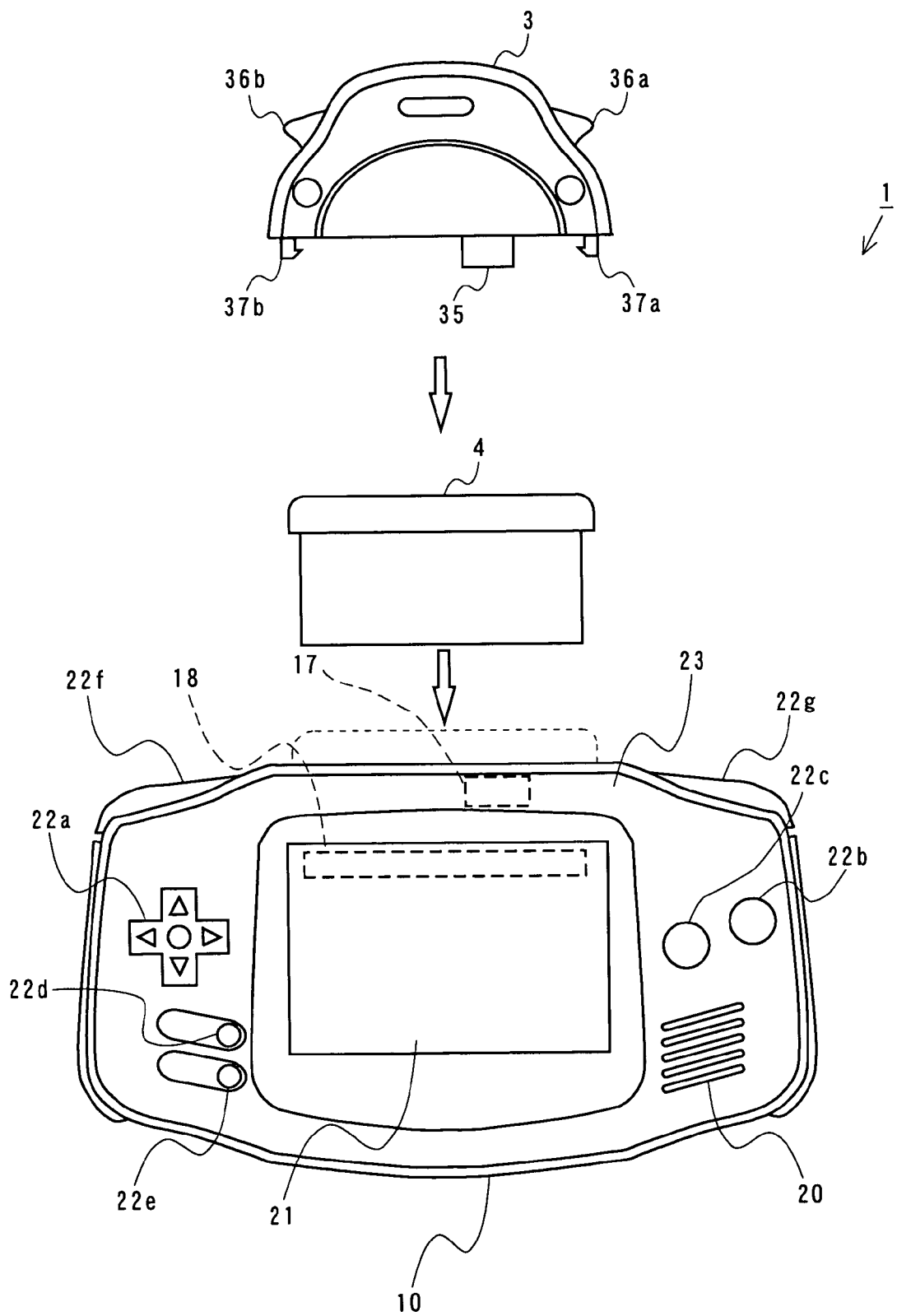
FIG. 1 is an external view of a game apparatus 1 included in a game system according to one illustrative embodiment.

With reference to the drawings, a structure of a game apparatus 1 included in a game system according to one illustrative embodiment will be described. Note that FIG. 1 is an external view of the portable game apparatus 1 included in the game system, but a structure of the game system of the illustrative embodiments is not limited to the portable game apparatus 1. The structure of the game system of the illustrative embodiments can also be applied to a stationary game apparatus.

Figure 2:
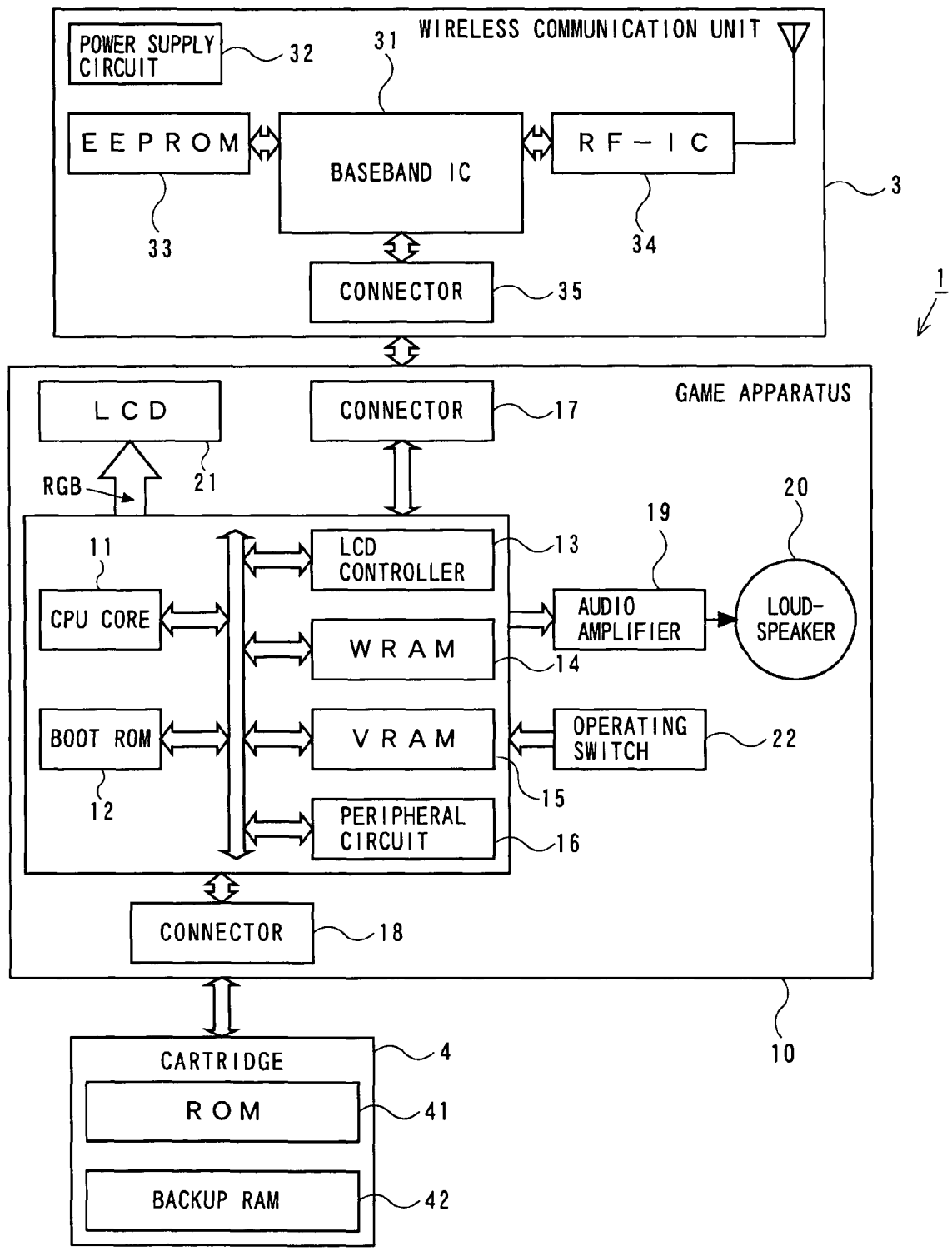
FIG. 2 is a functional block diagram of the game apparatus 1 including a game main unit 10, a cartridge 4, and a wireless communication unit 3 as shown in FIG. 1.

In FIG. 1, the exemplary illustrative game apparatus 1 comprises a game main unit 10, a game cartridge 4 (hereinafter, simply referred to as a cartridge), and a wireless communication unit 3, which are mounted in the game main unit 10. The cartridge 4 is used as an information storage medium for storing a game program, etc., and is inserted into the game main unit 10 in a direction of an arrow as shown in the drawing, whereby components such as a semiconductor memory, included in the cartridge 4 (a ROM 41 and a backup RAM 42 as shown in FIG. 2) are electrically connected with the game main unit 10. In an upper portion of a back surface of the game main unit 10, a cartridge insertion hole (not shown) is formed such that the cartridge 4 can be removably inserted therein. Around a bottom portion of this cartridge insertion hole, a connector 18 (an area as shown by the dashed line) is provided for electrical connection with the cartridge 4. The wireless communication unit 3 performs wireless communication with other game apparatus. By mounting the wireless communication unit 3 in the game main unit 10 in a direction of an arrow as shown in the drawing, received communication data is outputted to the game main unit 10, and communication data outputted from the game main unit 10 is transmitted to other game apparatus. In an upper portion of the back surface of the game main unit 10, a connector 17 (an area as shown by the dashed line) is provided for electrical connection with a connector 35 of the wireless communication unit 3.

The game main unit 10 includes a housing 23. At a center of one principal surface (a front face as shown in the drawing) of the housing 23, a liquid crystal display (LCD) 21 is formed. A loudspeaker 20 and operating switches 22a to 22g are provided on a space area lying on both sides of the LCD 21 or on a side of the housing 23. The above operating switches 22a to 22g give different operating instructions in accordance with a content of a game program to be processed by the game apparatus 1. Typically, the operating switch (cross key) 22a gives a traveling direction instruction, the operating switches 22b and 22c give a movement instruction such as "A" and "B", the operating switches 22d and 22e give a movement instruction such as "START" and "SELECT", and the operating switches 22f and 22g give a movement instruction such as "L" and "R".

The wireless communication unit 3 has the connector 35 provided on a lower portion, a pair of protuberances 36a and 36b provided on an upper portion, and a pair of engaging members 37a and 37b provided on the same lower portion as the connector 35. The protuberances 36a and 36b jut outwards from both right and left of the wireless communication unit 3. When the player depresses the protuberances 36a and 36b simultaneously, the engaging members 37a and 37b which are jutting downward from both right and left on the bottom surface slide outwards. When the player stops depressing the protuberances 36a and 36b, the engaging members 37a and 37b slide inwards since the protuberances 36a and 36b are biased outwards. On the other hand, engaging holes (not shown) which are to be engaged with the engaging members 37a and 37b are formed in the game main unit 10. The player connects the connector 35 of the wireless communication unit 3 with the connector 17 of the game main unit 10, and engages the engaging members 37a and 37b with the respective engaging holes, whereby the wireless communication unit 3 is mounted in the game main unit 10. Also, an antenna used by the wireless communication unit 3 to perform wireless communication with other game apparatuses is formed on a substrate in the housing, so as not to be seen from outside.

FIG. 2 is an exemplary illustrative functional block diagram of the game apparatus 1 including the game main unit 10, the cartridge 4, and the wireless communication unit 3. In FIG. 2, other than the above-described component elements, the game main unit 10 includes a central processing unit (CPU core) 11, a boot ROM 12, an LCD controller 13, a working RAM (WRAM) 14, a video RAM (VRAM) 15, a peripheral circuit 16, and an audio amplifier 19. Also, other than the above-described component elements, the wireless communication unit 3 includes a baseband IC 31, a power supply circuit 32, an EEPROM (Electrically Erasable Programmable Read-Only Memory) 33, and an RF-IC (Radio Frequency-IC) 34. Also, other than the above-described component elements, the cartridge 4 includes a ROM 41 and a backup RAM 42.

The ROM 41 stores a game program, in which a content of a game to be played by the game apparatus 1 is described, and image and audio data of the game program. Also, the ROM 41 stores a game serial number (GSN) indicating a type of the above-described game program and a game name. Based on the game program stored in the ROM 41, the CPU core 11 operates in a game process mode. The CPU core 11 is connected to each component element via a predetermined bus, and is connected to the connectors 17 and 18. Data inputted from the connectors 17 and 18 is outputted to the CPU core 11. Also, the data processed by the CPU core 11 can be outputted to the connectors 17 and 18.

The CPU core 11 processes a startup program stored in the boot ROM 12, and operates in a game process mode based on the game program stored in the ROM 41. When the cartridge 4 is inserted into the game main unit 10, the CPU core 11 accesses the ROM 41 via the connector 18. Also, based on an operation signal inputted from the operating switch 22 and the game program, the CPU core 11 executes a game process, causes the WRAM 14 to store the currently processed data, and causes the VRAM 15 to temporarily store the image data.

When the CPU core 11 operates in a game process mode, the WRAM 14 stores, for example, a game program, process data, and a transmission frame in which data to be transmitted to other game apparatus is described, and is timely used as a storage area required for a process performed by the CPU core 11. Also, when the game apparatus 1 transmits the above transmission frame to other game apparatus, a transmission frame stored in the WRAM 14 is used, and outputted to the wireless communication unit 3 via the connector 17 based on an instruction from the CPU core 11. Also, a reception frame received from other game apparatus via the wireless communication unit 3 is processed by the CPU core 11, and is timely stored in the WRAM 14.

The audio amplifier 19, which includes a D/A conversion circuit and an amplification circuit, converts audio data generated based on the processing result of the game program by the CPU core 11 to an audio signal (analog signal), appropriately amplifies the audio signal, and causes the loudspeaker 20 to output the resultant audio signal as audio or sound effects.

The CPU core 11 performs image processing by using a storage area of the WRAM 14 and the VRAM 15. The CPU core 11 generates game image data to be displayed on the LCD 21 using the above storage area, and stores the generated image data in the VRAM 15. The LCD controller 13 performs display control for displaying the image data stored in the VRAM 15 on the LCD 21, and causes the LCD 21 to display the image data. The VRAM 15 temporarily stores the image data processed by the CPU core 13.

The peripheral circuit 16 performs processing such as audio processing, DMA (direct memory access), timer control, and input/output control.

On the other hand, the ROM 41 of the cartridge 4 fixedly stores a game program, various data to be used in the game program, a GSN, and a game name. Via the connector 18, the game data obtained as a result of the execution of the game program is rewritably stored in the backup RAM 42 in a nonvolatile manner. The game data stored in the backup RAM 42 includes, for example, backup data indicating a time elapsed after the end of the game. Note that the backup RAM 42 may be structured as a flash memory, etc.

The baseband IC 31 of the wireless communication unit 3 receives data to be transmitted, from the game main unit 10, via the connectors 17 and 35, encodes the received data, and transmits the encoded data to the RF-IC 34. The RF-IC 34 modulates the data from the baseband IC 31, and transmits the modulated data from the antenna via radio waves. Also, radio waves transmitted from other game apparatus are received by the antenna, and demodulated by the RF-IC 34. The signal demodulated by the RF-IC 34 is outputted to the baseband IC 31. The baseband IC 31 decodes the demodulated signal to obtain data, and transfers the obtained data to the game main unit 10 via the connectors 35 and 17. The EEPROM 33 stores an apparatus ID and a user name, which is inputted by a user, in a nonvolatile manner. Note that the apparatus ID may be a unique serial number stored in a manufacturing plant, or may be identification information randomly generated by the game apparatus 1. The power supply circuit 32 supplies power to each component element of the wireless communication unit 3. Note that, in the present example, wireless communication is performed by short distance wireless communication using weak radio waves.

Prior to describing a data map image of an illustrative embodiment and a flowchart to be executed by the game apparatus 1, grouping provided by the game apparatus 1 executing the game program will be described below by referring to, for example, an operation of the entire game system and an exemplary game screen of each game apparatus 1.

Figure 3:
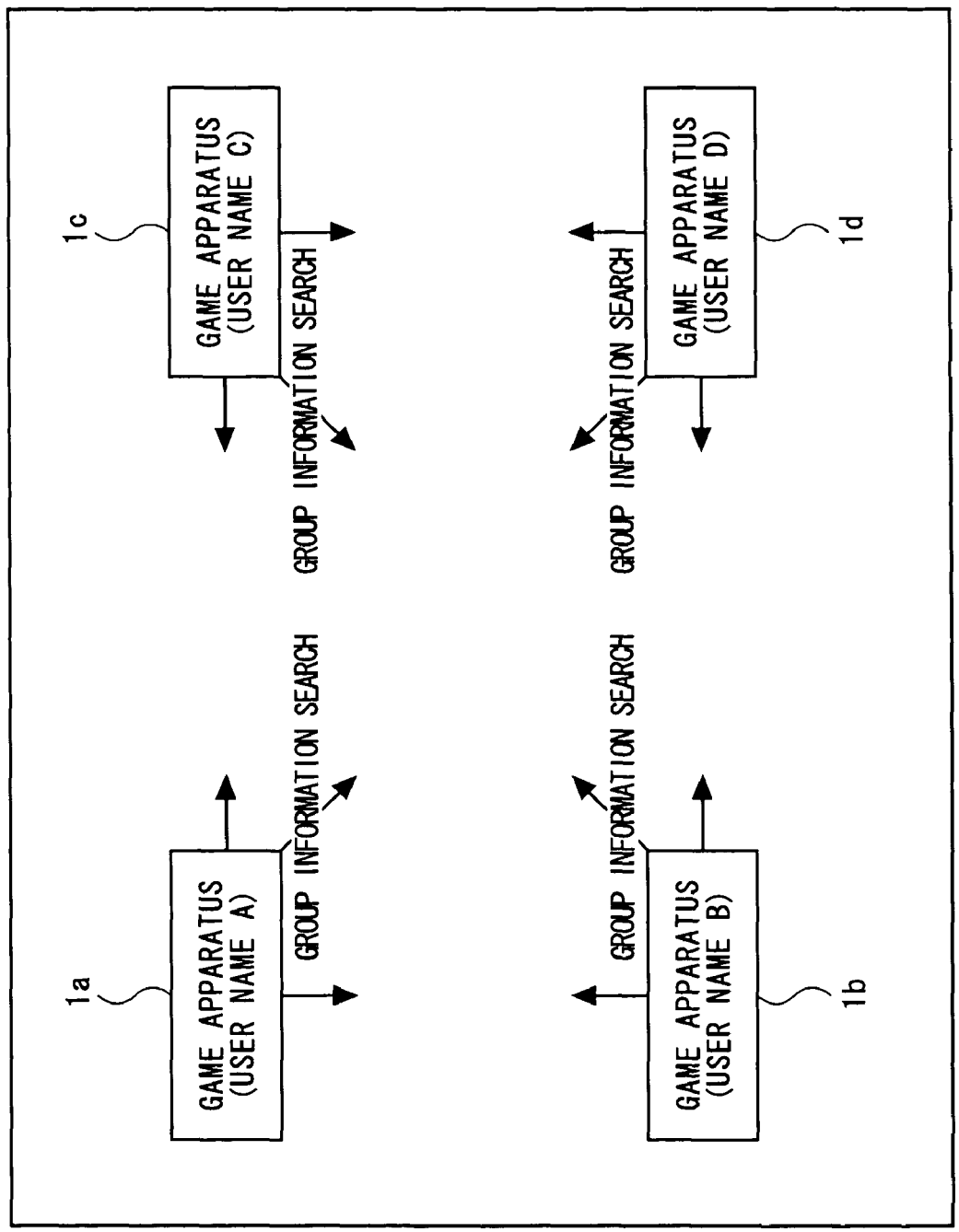
FIG. 3 is a schematic diagram showing a plurality of game apparatuses 1 that are present in a range where wireless communication is available.

FIG. 3 is an exemplary illustrative schematic diagram showing a plurality of game apparatuses 1 that are present in a range where wireless communication between the apparatuses is available. To be more specific, assume that four game apparatuses 1a, 1b, 1c, and 1d are present in the above range, and the game apparatus 1a is to be operated by a player A (user A), the game apparatus 1b is to be operated by a player B (user B), the game apparatus 1c is to be operated by a player C (user C), and the game apparatus 1d is to be operated by a player D (user D). The four game apparatuses 1a to 1d each have the same structure as that of the above-described game apparatus 1. Thus, in order to identify each component element of the above game apparatuses 1a to 1d in the following description, subscripts a to d are each added to the corresponding end of each of the reference numerals of the component elements of the game apparatuses 1a to 1d.

Figure 4:
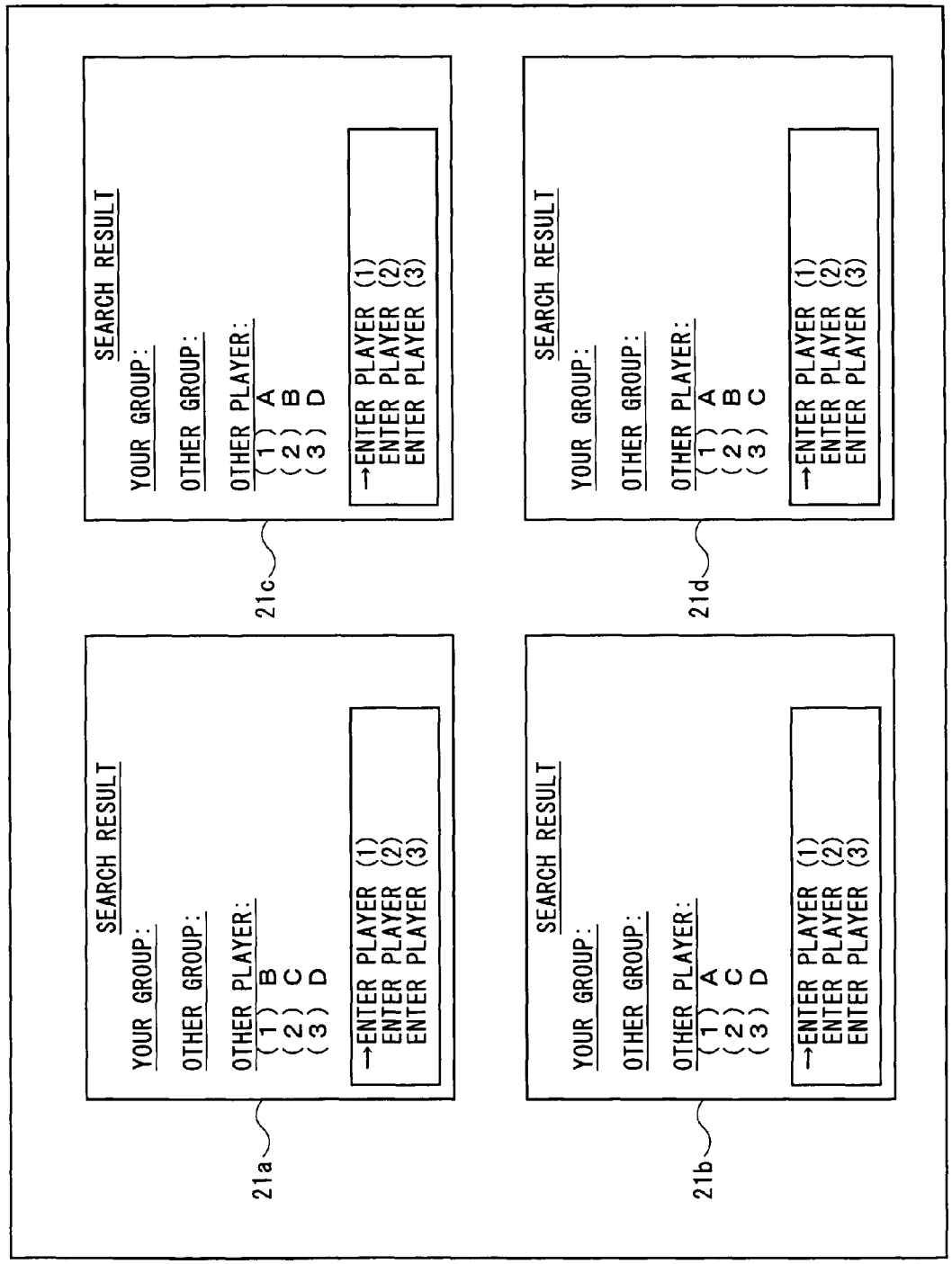
FIG. 4 shows exemplary screens displayed on LCDs 21a to 21d of game apparatuses 1a to 1d when group information search is performed in a situation as shown in FIG. 3.

In the case where a group is formed from scratch by the game apparatuses 1a to 1d to play a multiplayer game, the game apparatuses 1a to 1d perform group information searches by using wireless communication. FIG. 4 shows exemplary screens to be displayed on the LCDs 21a to 21d of the respective game apparatuses 1a to 1d when group information searches are performed in a situation as shown in FIG. 3.

In FIG. 4, a current status of the game apparatuses 1 and a group present in the above range are displayed on the LCDs 21a to 21d of the game apparatuses 1a to 1d as a search result. In the search result, the status of the game apparatus 1 is represented as a game apparatus belonging to a group or an independent game apparatus. In the case where the game apparatus 1a has already formed a group with other game apparatuses, the makeup of the group is displayed in the category of "YOUR GROUP". Also, in the case where a group to which the game apparatus 1a does not belong has been formed in the above range, the makeup of the group is displayed in the category of "OTHER GROUP". A game apparatus 1 which does not belong to any group is classified in the category of "OTHER PLAYER", and a user name of the game apparatus is displayed. Also, based on these search results, any available groups or players with whom a group can be formed are displayed as options.

In the situation as shown in FIG. 3, a group is not formed in the above range. Thus, in the search result as displayed on the LCD 21a, nothing is displayed in the categories of "YOUR GROUP" and "OTHER GROUP", or "NONE" is displayed therein. In the category of "OTHER PLAYER", the user names B, C, and D of the game apparatuses 1b to 1d are displayed. Also, as the above-described available grouping options, the user names B, C, and D are displayed (in FIG. 3, an item number corresponding to a user name is indicated). In the search result on the LCD 21b, "YOUR GROUP" and "OTHER GROUP" are displayed in the same manner as that of the LCD 21a, and the user names A, C, and D are displayed in the category of "OTHER PLAYER". In the search result on the LCD 21c, "YOUR GROUP" and "OTHER GROUP" are displayed in the same manner as that of the LCD 21a, and the user names A, B, and D are displayed in the category of "OTHER PLAYER". In the search result on the LCD 21d, "YOUR GROUP" and "OTHER GROUP" are displayed in the same manner as that of the LCD 21a, and the user names A, B, and C are displayed in the category of "OTHER PLAYER".

Figure 5:
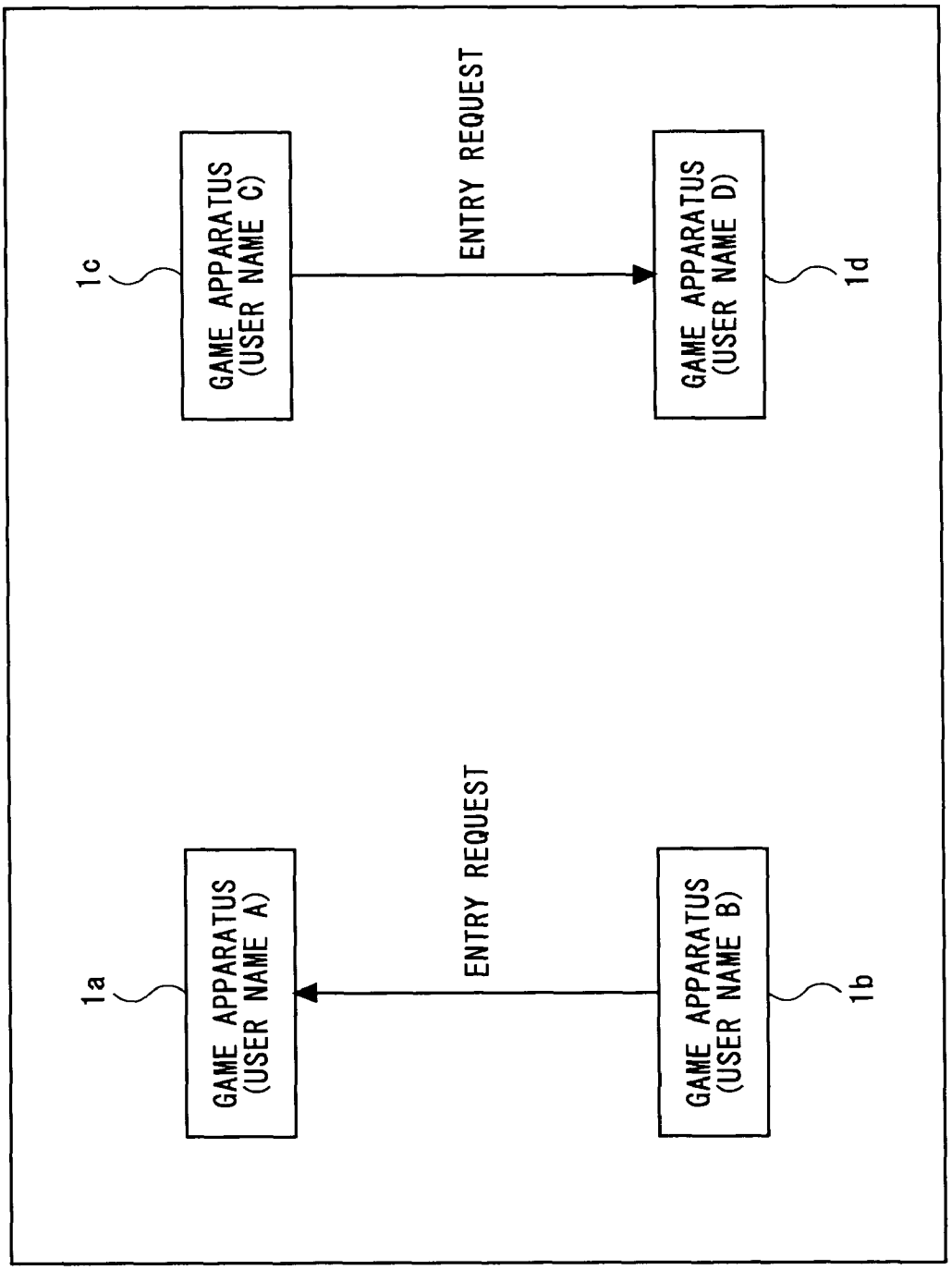
FIG. 5 is a schematic diagram showing a situation in which an entry request is transmitted/received by the game apparatuses 1 as shown in FIG. 3.

Next, an entry request is transmitted from the game apparatus 1 operated by a player requesting entry to a receiving game apparatus 1 by using wireless communication. FIG. 5 is an exemplary illustrative schematic diagram showing a situation in which an entry request is transmitted/received by the game apparatuses 1 as shown in FIG. 3.

In FIG. 5, the game apparatus 1b as shown in FIG. 3 transmits an entry request to the game apparatus 1a by using wireless communication. Also, the game apparatus 1c transmits an entry request to the game apparatus 1d by using wireless communication.

Figure 6:
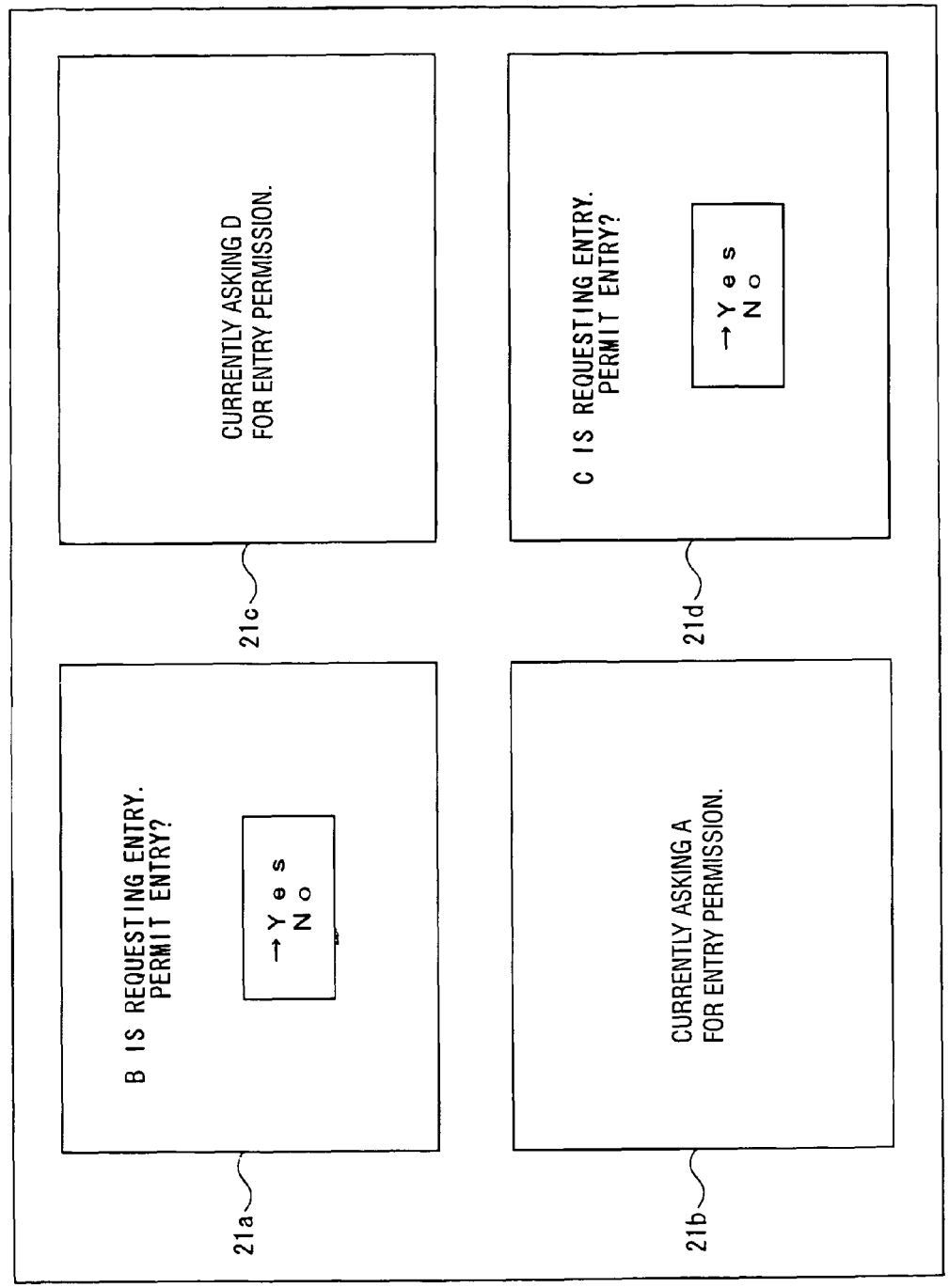
FIG. 6 shows exemplary screens displayed on the LCDs 21a to 21d of the respective game apparatuses 1a to 1d when an entry request as shown in FIG. 5 is transmitted.

FIG. 6 shows exemplary screens displayed on the LCDs 21a to 21d of the respective game apparatuses 1a to 1d when the entry request as shown in FIG. 5 is transmitted.

In FIG. 6, on the LCDs 21b and 21c of the respective entry requesting game apparatuses 1b and 1c, a user name of the apparatus to which entry was requested and requesting entry message are displayed. On the other hand, on the LCDs 21a and 21d of the respective game apparatuses 1a and 1d to which entry was requested, a user name of the entry requesting game apparatus and options on whether or not to permit the entry are displayed.

Figure 7:
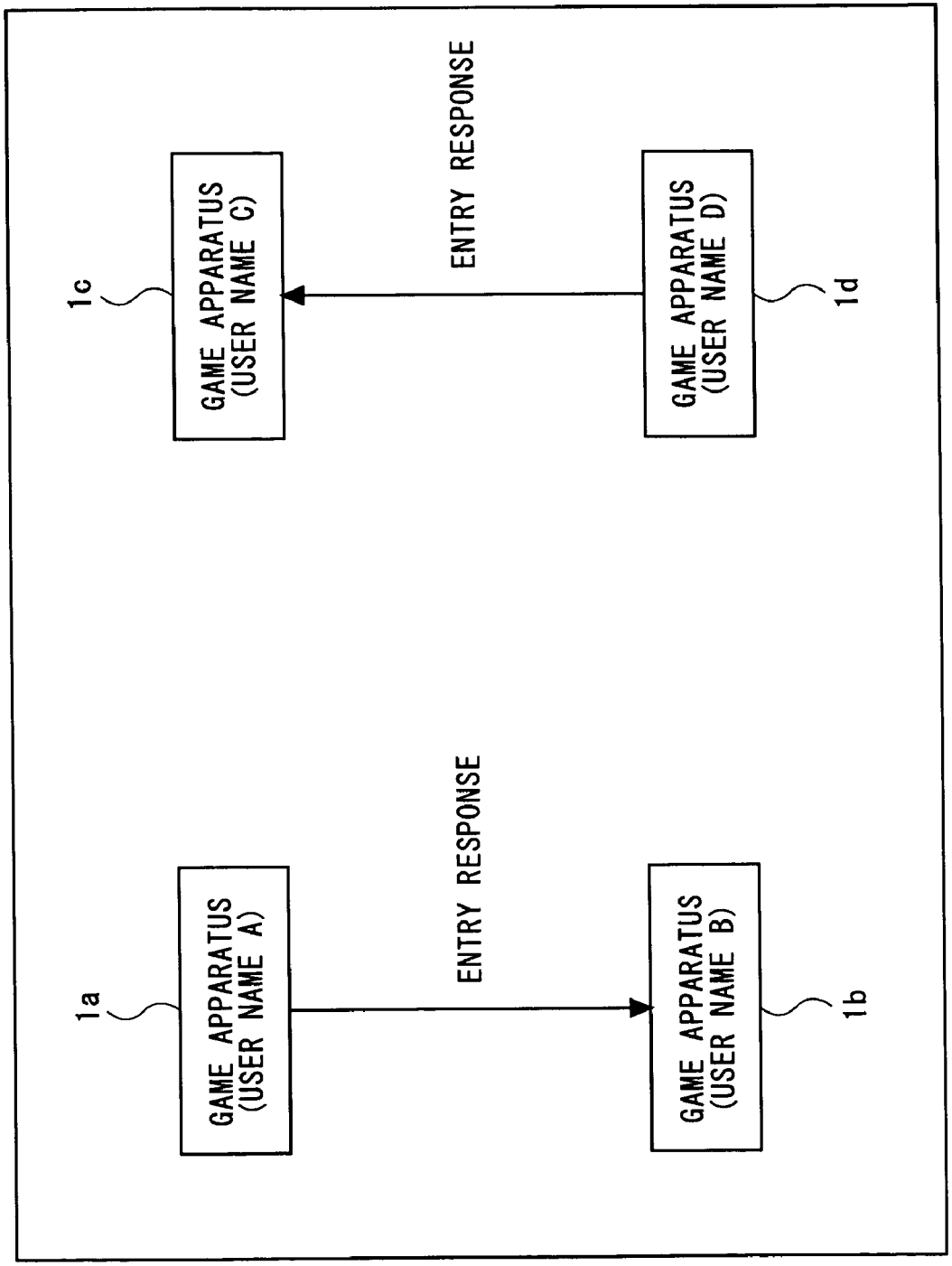
FIG. 7 is a schematic diagram showing a situation in which an entry response is transmitted/received by the game apparatuses 1 as shown in FIG. 5.

Next, an entry response is transmitted from the game apparatus 1 operated by the player controlling the apparatus to which entry was requested to the entry requesting game apparatus 1 by using wireless communication. FIG. 7 is an exemplary illustrative schematic diagram showing a situation in which the entry response is transmitted/received by the game apparatuses 1 as shown in FIG. 5.

Figure 8:
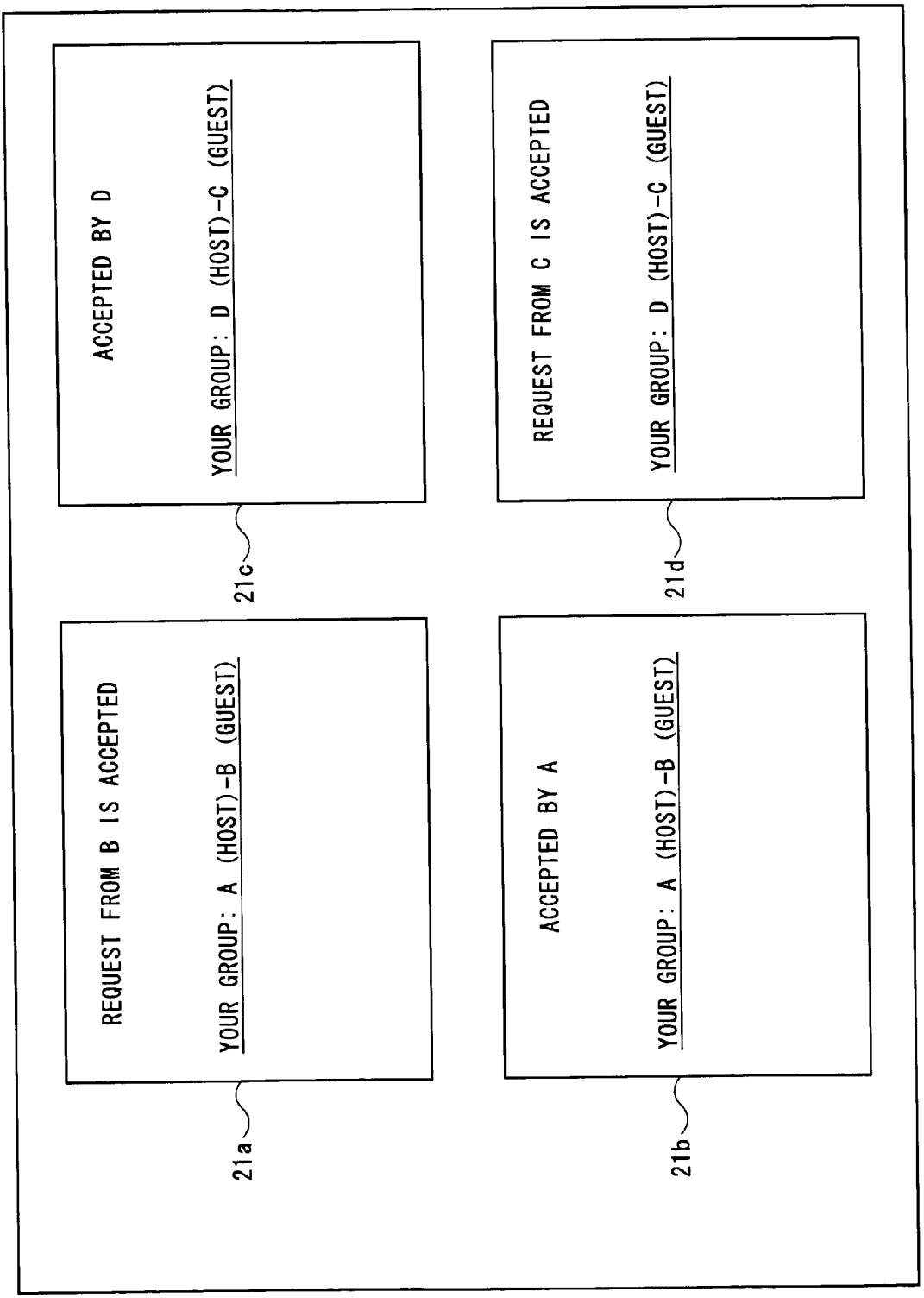
FIG. 8 shows exemplary screens displayed on the LCDs 21a to 21d of the respective game apparatuses 1a to 1d when an entry response as shown in FIG. 7 is transmitted.

In FIG. 7, the game apparatus 1a to which entry was requested transmits an entry response to the entry requesting game apparatus 1b by using wireless communication. Also, the game apparatus 1d to which entry was requested transmits an entry response to the entry requesting game apparatus 1c by using wireless communication. FIG. 8 shows exemplary screens displayed on the LCDs 21a to 21d of the respective game apparatuses 1a to 1d when the entry response as shown in FIG. 7 is transmitted. Assume that the players A and D of the respective game apparatuses 1a and 1d each give an entry permit response.

In FIG. 8, on the LCDs 21a and 21d of the respective game apparatuses 1a and 1d giving an entry permit response, a user name of the allowed game apparatus and an entry accept message are displayed. By permitting entry of other game apparatuses, the makeup of the group to which the game apparatus belongs is displayed in "YOUR GROUP" on the LCDs 21a and 21d. Here, according to a rule of the game system, the entry requested game apparatuses 1a and 1d may each become a host apparatus, whereas the entry requesting game apparatuses 1b and 1c may each become a guest apparatus. Thus, on the LCD 21a of the game apparatus 1a, "A (HOST)-B (GUEST)" is displayed as a group to which the game apparatus 1a belongs. Also, on the LCD 21d of the game apparatus 1d, "D (HOST)-C (GUEST)" is displayed as a group to which the game apparatus 1d belongs. On the LCDs 21b and 21c of the respective game apparatuses that were granted entry, 1b and 1c, a user name of the entry permitting game apparatus and a message reading "entry is completed" are displayed. By receiving the entry permit response, the makeup of a group to which the game apparatus belongs is displayed in "YOUR GROUP" on the LCDs 21b and 21c. On the LCD 21b of the game apparatus 1b, "A (HOST)-B (GUEST)" is displayed in "YOUR GROUP" as a group to which the game apparatus 1b belongs. Also, on the LCD 21c of the game apparatus 1c, "D (HOST)-C (GUEST)" is displayed in "YOUR GROUP" as a group to which the game apparatus 1c belongs. As a result, a group consisting of the game apparatuses 1a and 1b and a group consisting of the game apparatuses 1c and 1d are formed in the above range.

Figure 9:
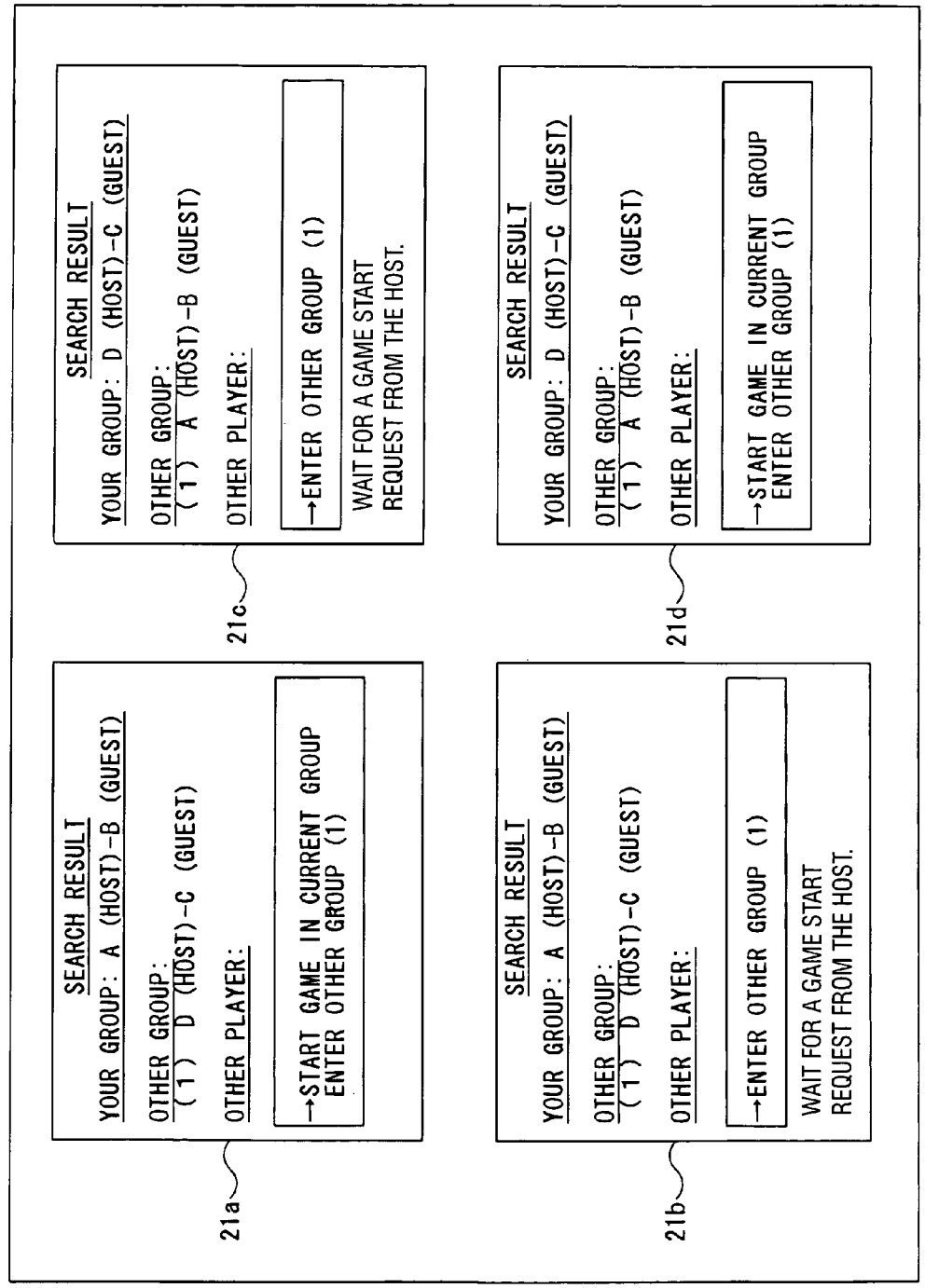
FIG. 9 shows exemplary screens displayed on the LCDs 21a to 21d of the respective game apparatuses 1a to 1d when a group information search is performed after the situation as shown in FIG. 7.

Next, the game apparatuses 1a to 1d each a perform group information search by using wireless communication. A schematic diagram of this group information search is identical to that of FIG. 3. FIG. 9 shows exemplary screens displayed on the LCDs 21a to 21d of the respective game apparatuses 1a to 1d when the above group information search is performed.

In FIG. 9, as is the case with FIG. 4, the current status of the game apparatuses 1 and a group present in the above range are displayed on the LCDs 21a to 21d of the game apparatuses 1a to 1d as a search result. As mentioned above, a group consisting of the game apparatuses 1a and 1b and a group consisting of the game apparatuses 1c and 1d are currently formed in the above range. Thus, in the search result as displayed on the LCD 21a of the host game apparatus 1a, "A (HOST)-B (GUEST)" is displayed in "YOUR GROUP", and "D (HOST)-C (GUEST)" is displayed in "OTHER GROUP". Nothing or "NONE" is displayed in "OTHER PLAYER" due to the absence of an independent game apparatus 1. Here, as a rule of the game system, a host game apparatus 1 is authorized to start a group game with a guest apparatus belonging to the group. Thus, on the LCD 21a of the host game apparatus 1a, "start a game in a current group" and "enter other available group" (in FIG. 9, an item number corresponding to other group is indicated) are displayed as options. Similarly, in the search result as displayed on the LCD 21d of the host game apparatus 1d, "D (HOST)-C (GUEST)" is displayed in "YOUR GROUP", and "A (HOST)-B (GUEST)" is displayed in "OTHER GROUP". Nothing is displayed in "OTHER PLAYER". Also, on the LCD 21d, "start a game in a current group" and "enter other available group" are displayed as options.

On the other hand, in the search result as displayed on the LCD 21b of the guest game apparatus 1b, "A (HOST)-B (GUEST)" is displayed in "YOUR GROUP", and "D (HOST)-C (GUEST)" is displayed in "OTHER GROUP". Nothing is displayed in "OTHER PLAYER". Also, on the LCD 21b, only an option "enter other available group" is displayed. As mentioned above, the guest game apparatus 1 is not authorized to start the game. Thus, if a group change is not performed, a message reading "wait for a game start request from the host" is displayed on the LCD 21 of the guest game apparatus 1. Similarly, in the search result as displayed on the LCD 21c of the guest game apparatus 1c, "D (HOST)-C (GUEST)" is displayed in "YOUR GROUP", and "A (HOST)-B (GUEST)" is displayed in "OTHER GROUP". Nothing is displayed in "OTHER PLAYER". Also, on the LCD 21c, only an option "enter other available group" is displayed, and a message reading "wait for a game start request from the host" is displayed if a group change is not performed.

Note that a guest apparatus may be authorized to start a game. In this case, the guest apparatus may transmit a game start request to the host apparatus, and the host apparatus may decide to start a game and notify each guest apparatus of the start of the game.

Figure 10:
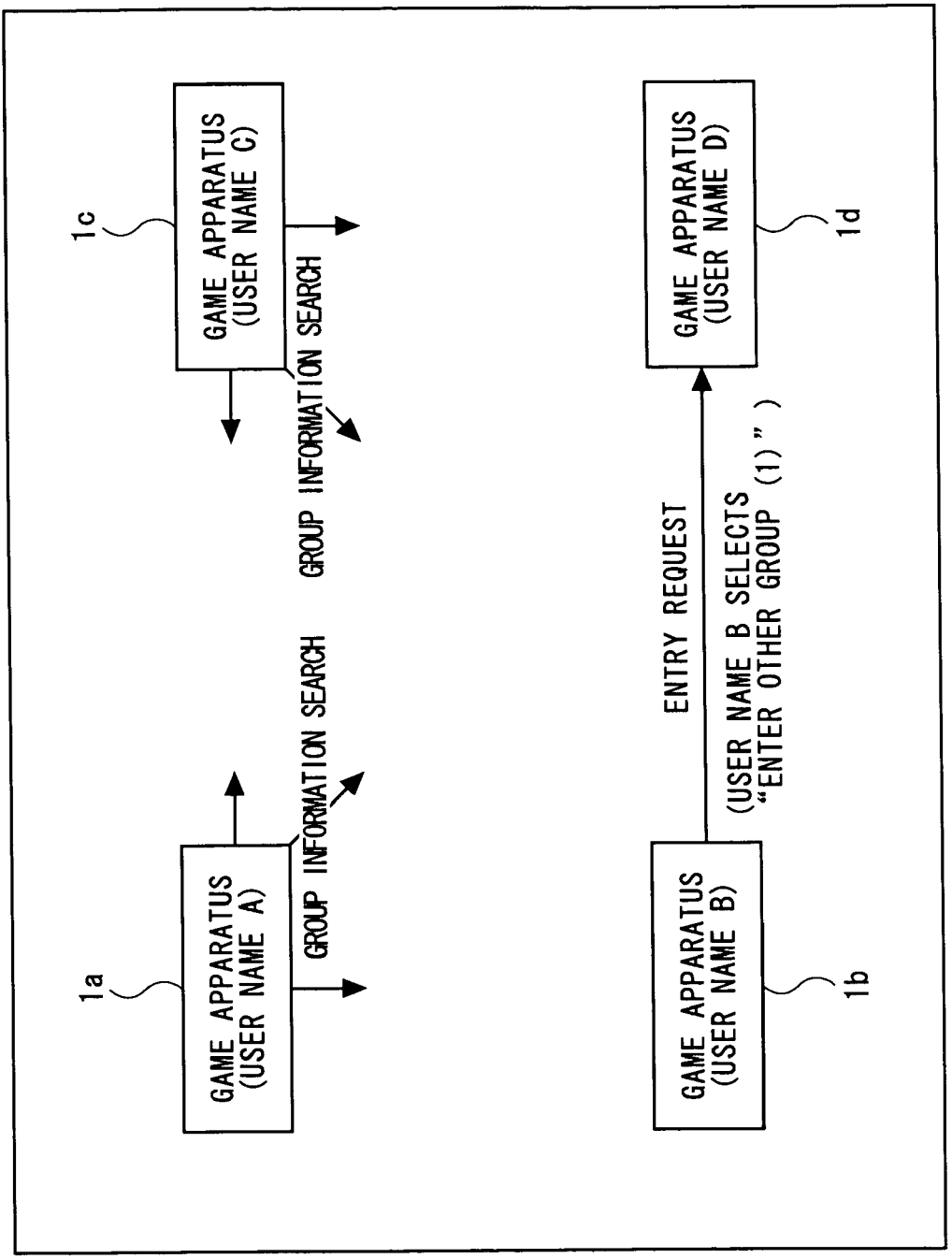
FIG. 10 is a schematic diagram showing a situation in which an entry request is further transmitted/received by the game apparatuses 1 as shown in FIG. 7.

Next, an entry request is further transmitted from the game apparatus 1 operated by the entry requesting player to the game apparatus 1 to which entry is requested by using wireless communication. FIG. 10 is an exemplary illustrative schematic diagram showing a situation in which an entry request is further transmitted/received by the game apparatuses 1 as shown in FIG. 7.

Figure 11:
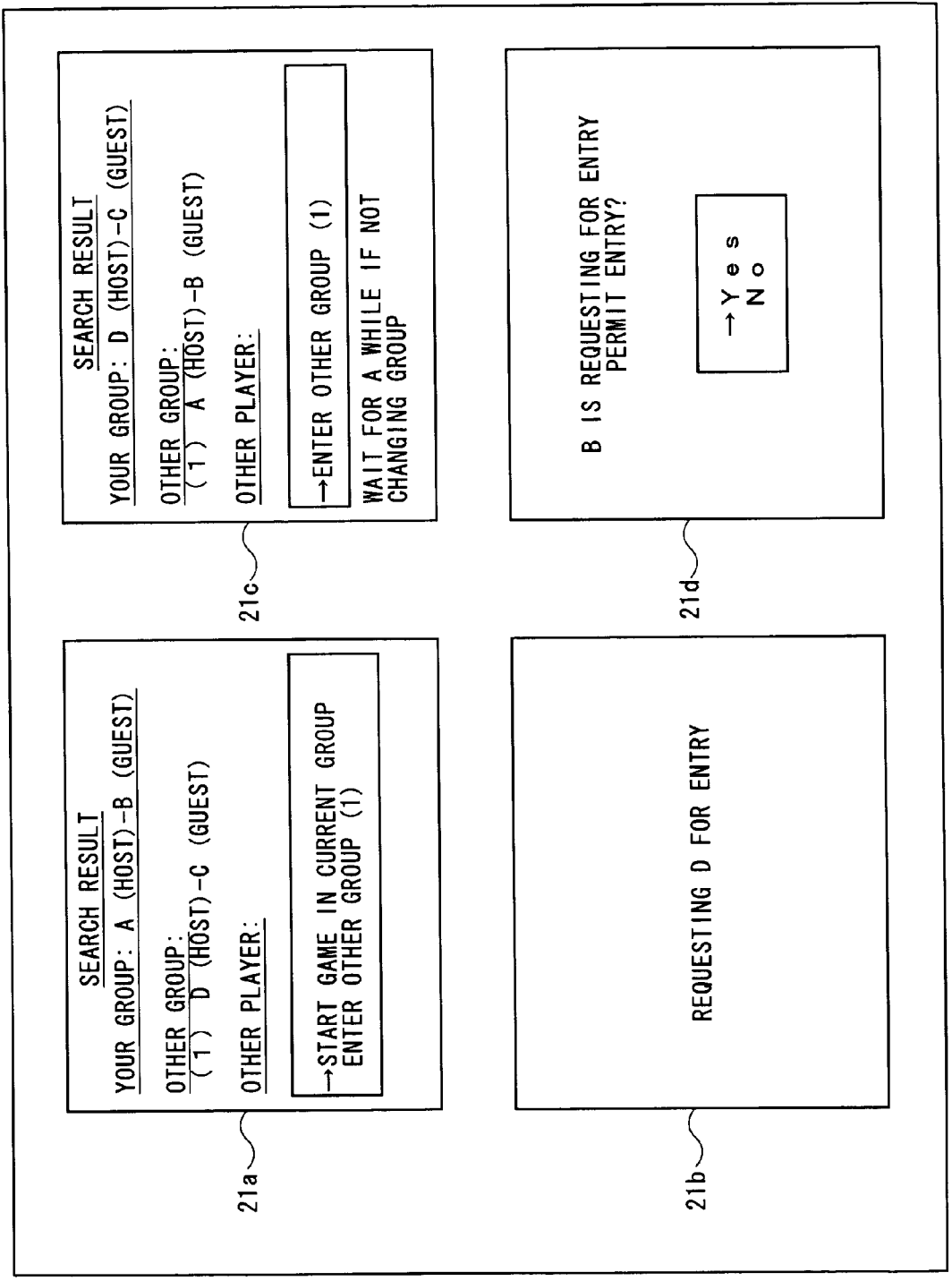
FIG. 11 shows exemplary screens displayed on the LCDs 21a to 21d of the respective game apparatuses 1a to 1d when an entry request as shown in FIG. 10 is transmitted.

In FIG. 10, the game apparatus 1b transmits an entry request to "OTHER GROUP", i.e., "D (HOST)-C (GUEST)" by using wireless communication. Such a request may be transmitted, for example, when the player B prefers playing the multiplayer game with the players C and D in a group of three to playing the multiplayer game with the player A in a group of two. In this case, an entry request is transmitted to a host apparatus (game apparatus 1d) of the group to which entry is requested. Also, other game apparatuses 1a and 1c continue to perform the above-described group information searches. FIG. 11 shows exemplary screens displayed on the LCDs 21a to 21d of the respective game apparatuses 1a to 1d when the entry request as shown in FIG. 10 is performed.

In FIG. 11, on the LCD 21b of the entry requesting game apparatus 1b, a user name of the game apparatus to which entry was requested and a requesting entry message are displayed. On the other hand, on the LCD 21d of the entry requested game apparatus 1d, a user name of the entry requesting game apparatus and options on whether or not to permit the entry are displayed. Also, on the LCDs 21a and 21c of the game apparatuses 1a and 1c continuing the above-described group information search, the search result identical to that of FIG. 9 is displayed.

Figure 12:
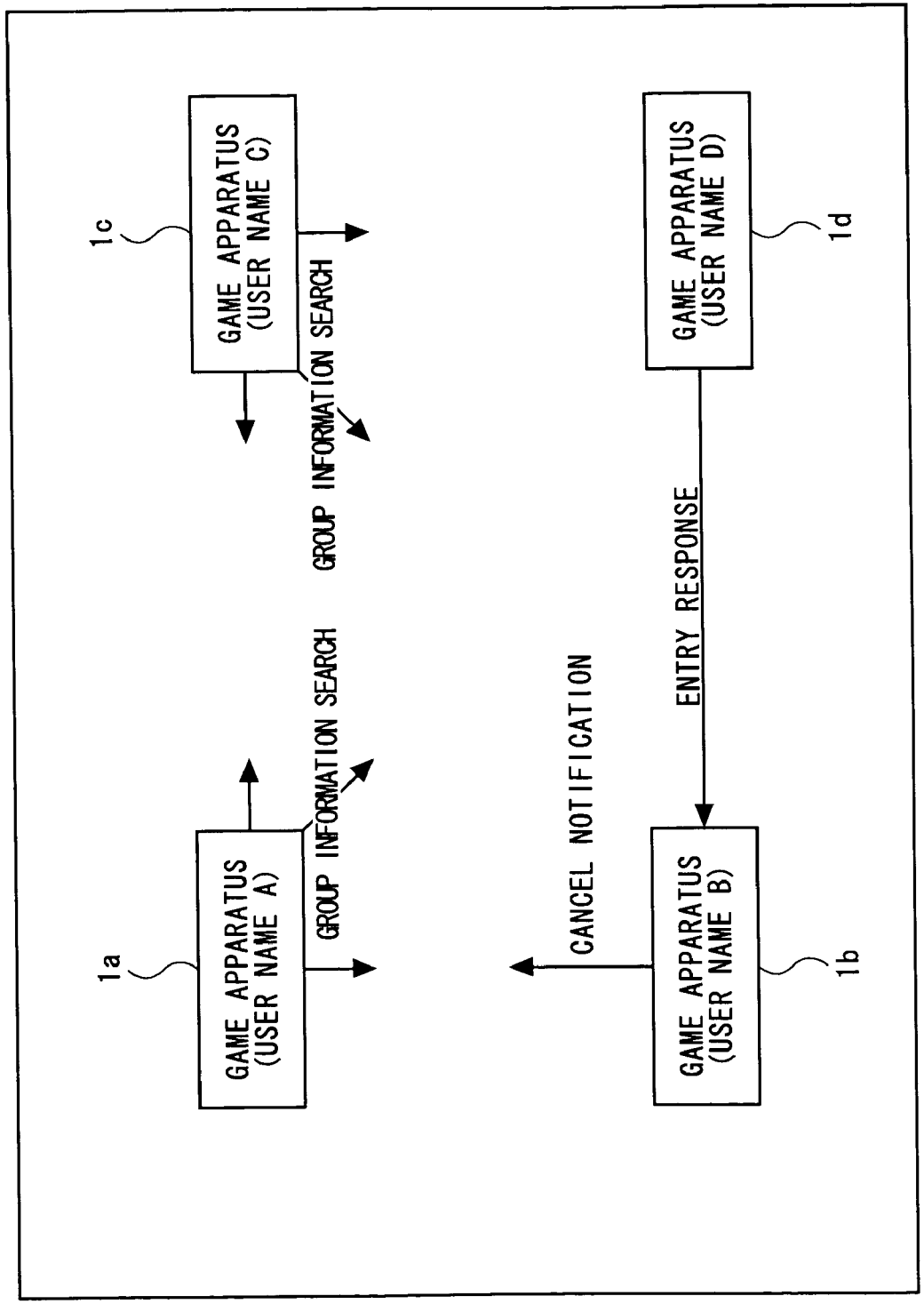
FIG. 12 is a schematic diagram showing a situation in which an entry response is transmitted/received by the game apparatuses 1 as shown in FIG. 10.

Next, an entry response is transmitted from the game apparatus 1 operated by the player hosting the group to which entry requested to the entry requesting game apparatus 1 by using wireless communication. FIG. 12 is an exemplary illustrative schematic diagram showing a situation in which an entry response is transmitted/received by the game apparatuses 1 as shown in FIG. 10.

Figure 13:
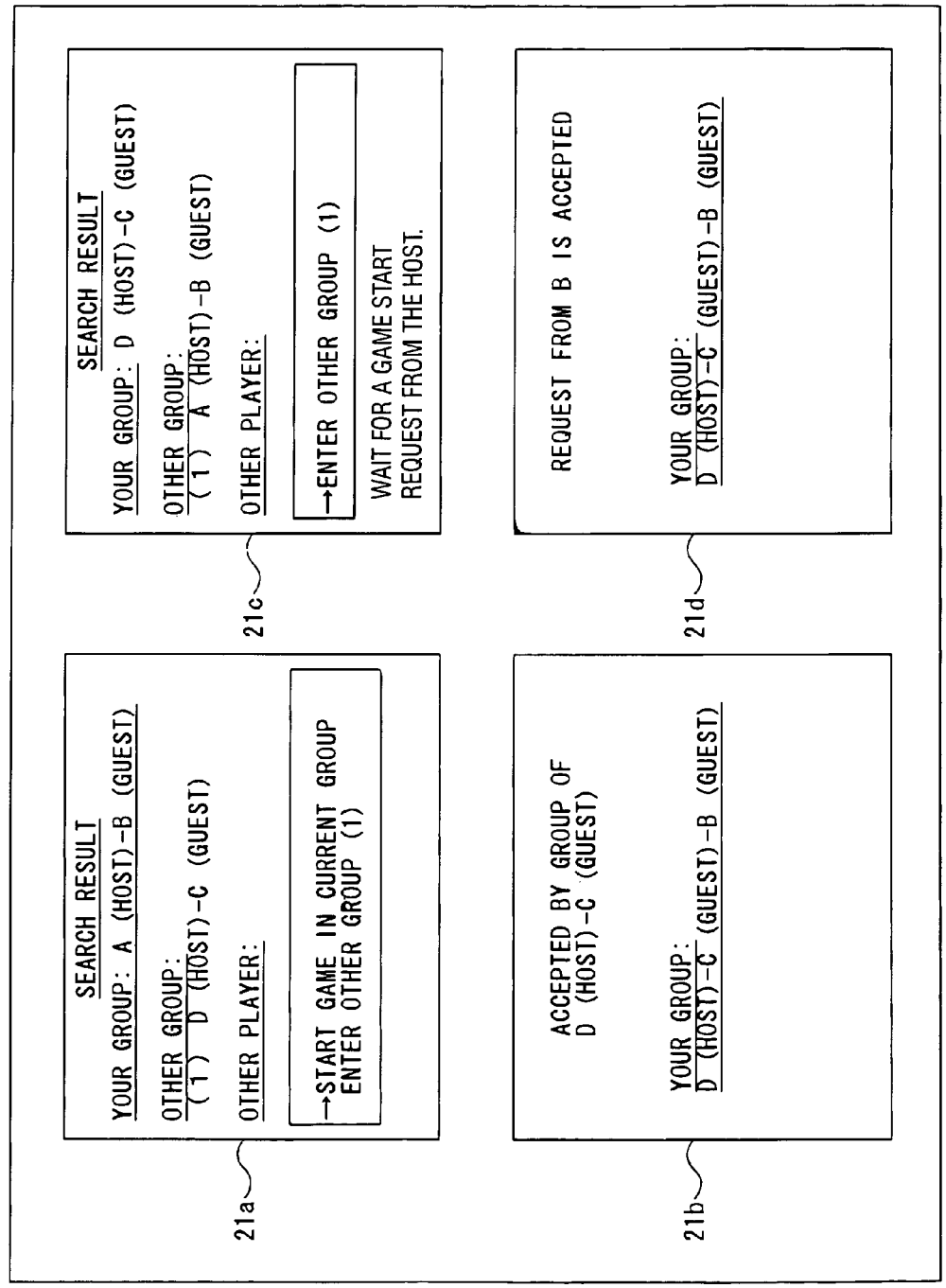
FIG. 13 shows exemplary screens displayed on the LCDs 21a to 21d of the respective game apparatuses 1a to 1d when an entry response as shown in FIG. 12 is transmitted.

In FIG. 12, the game apparatus 1d to which entry was requested transmits an entry response to the entry requesting game apparatus 1b by using wireless communication. FIG. 13 shows exemplary screens displayed on the LCDs 21a to 21d of the respective game apparatuses 1a to 1d when the entry response as shown in FIG. 12 is performed. Assume that the player D of the game apparatus 1d gives an entry permit response. As a result, the game apparatus that was permitted entry 1b belongs to a new group. Thus, after a screen display as shown in FIG. 13 is performed, the game apparatus 1b transmits a cancel notification to the host apparatus (game apparatus 1a) of the group to which the game apparatus 1b previously belonged by using wireless communication.

In FIG. 13, on the LCD 21d of the game apparatus 1d permitting entry, a user name of the game apparatus which permitted entry and an entry accept message are displayed. On the LCD 21d, the makeup of the group which has been changed as a result of permitting entry of another apparatus is also displayed in "YOUR GROUP". Specifically, on the LCD 21d, "D (HOST)-C (GUEST)-B (GUEST)" is displayed in "YOUR GROUP" as a group to which the game apparatus 1d belongs. On the other hand, on the LCD 21b of the game apparatus 1b to which entry was permitted, the makeup of the group the game apparatus 1b has entered and an entry completed message are displayed. Also, on the LCDs 21a and 21c of the game apparatuses 1a to 1c continuing the above-described group information search, the search result identical to that of FIG. 9 is displayed.

Figure 14:
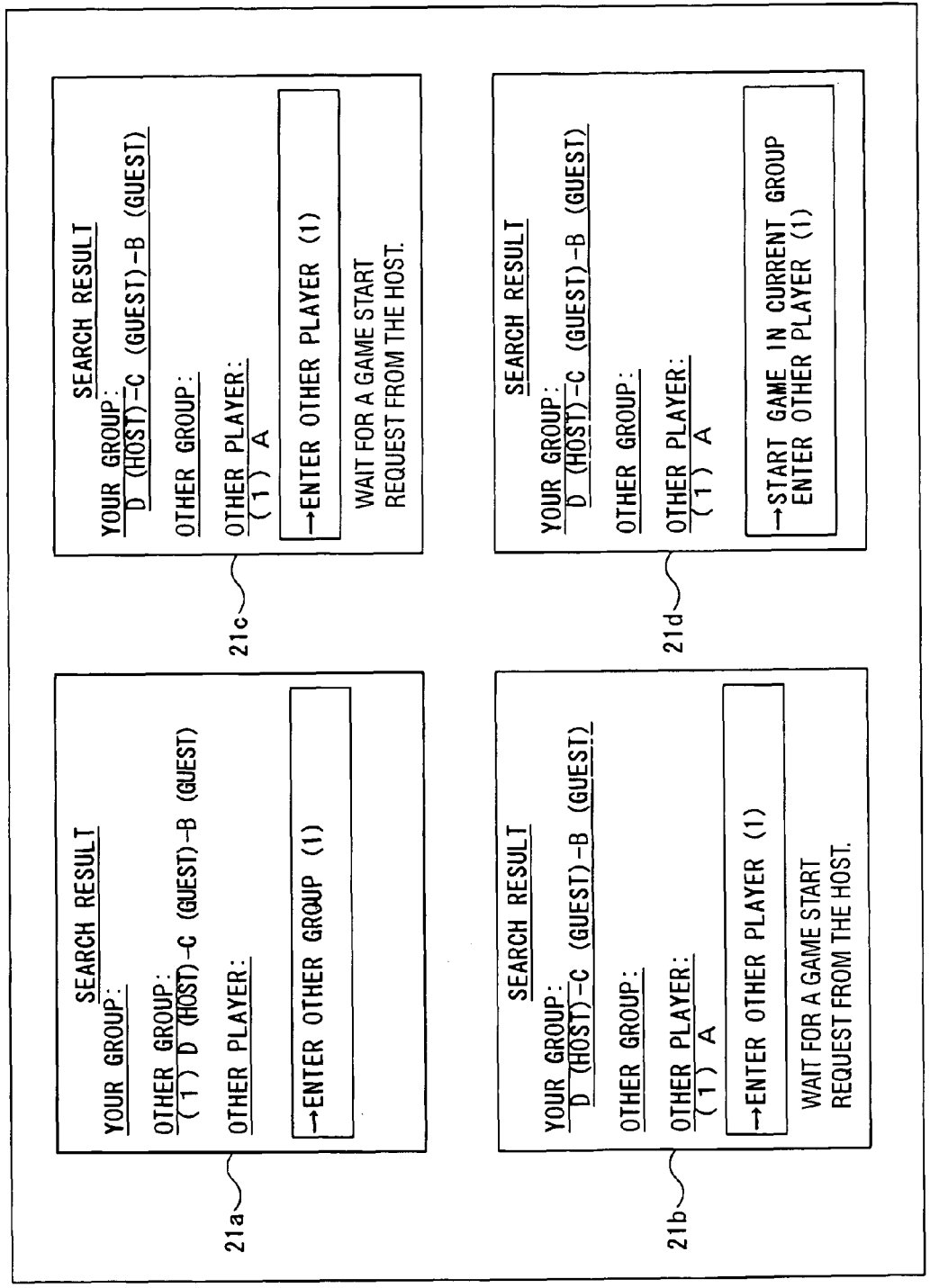
FIG. 14 shows exemplary screens displayed on the LCDs 21a to 21d of the respective game apparatuses 1a to 1d when a group information search is performed after a situation as shown in FIG. 12.

Next, after the game apparatus 1b transmits a cancel notification to the game apparatus 1a, the game apparatuses 1a to 1d each perform a group information search by using wireless communication. A schematic diagram of this group information search is identical to that of FIG. 3. FIG. 14 shows exemplary screens displayed on the LCDs 21a to 21d of the respective game apparatuses 1a to 1d when the above group information search is performed. Note that, by the above group information search, the game apparatus 1c knows that the game apparatus 1b has entered the group to which the game apparatus 1c belongs.

In FIG. 14, as is the case with FIG. 4, a current status of the game apparatuses 1 present in the above range is displayed on the LCDs 21a to 21d of the respective game apparatuses 1a to 1d as a search result. Currently, a group consisting of the game apparatuses 1b to 1d and an independent game apparatus 1a are present in the above-described range. Thus, in the search result as displayed on the LCD 21d of the game apparatus 1d (host apparatus), "D (HOST)-C (GUEST)-B (GUEST)" is displayed in "YOUR GROUP", nothing is displayed in "OTHER GROUP", and a user name A is displayed in "OTHER PLAYER". Also, on the LCD 21d, "start game in a current group" and "enter other player" (in FIG. 14, an item number corresponding to other player is indicated) are displayed as options.

On the other hand, in the search result as displayed on each of the LCDs 21b and 21c of the game apparatuses 1b and 1c (guest apparatus), "D (HOST)-C (GUEST)-B (GUEST)" is displayed in "YOUR GROUP", nothing is displayed in "OTHER GROUP", and a user name A is displayed in "OTHER PLAYER". Also, on the LCDs 21b and 21c, only an option "enter other player" is displayed. If a group change is not performed, a wait message is displayed on the LCDs 21b and 21c.

Also, in the search result as displayed on the LCD 21a of the game apparatus 1a, "D (HOST)-C (GUEST)-B (GUEST)" is displayed in "OTHER GROUP", and nothing is displayed in "YOUR GROUP" and "OTHER PLAYER". Also, on the LCD 21a, only an option "enter other group" (in FIG. 14, an item number corresponding to other group is indicated) is displayed.

Figure 15:
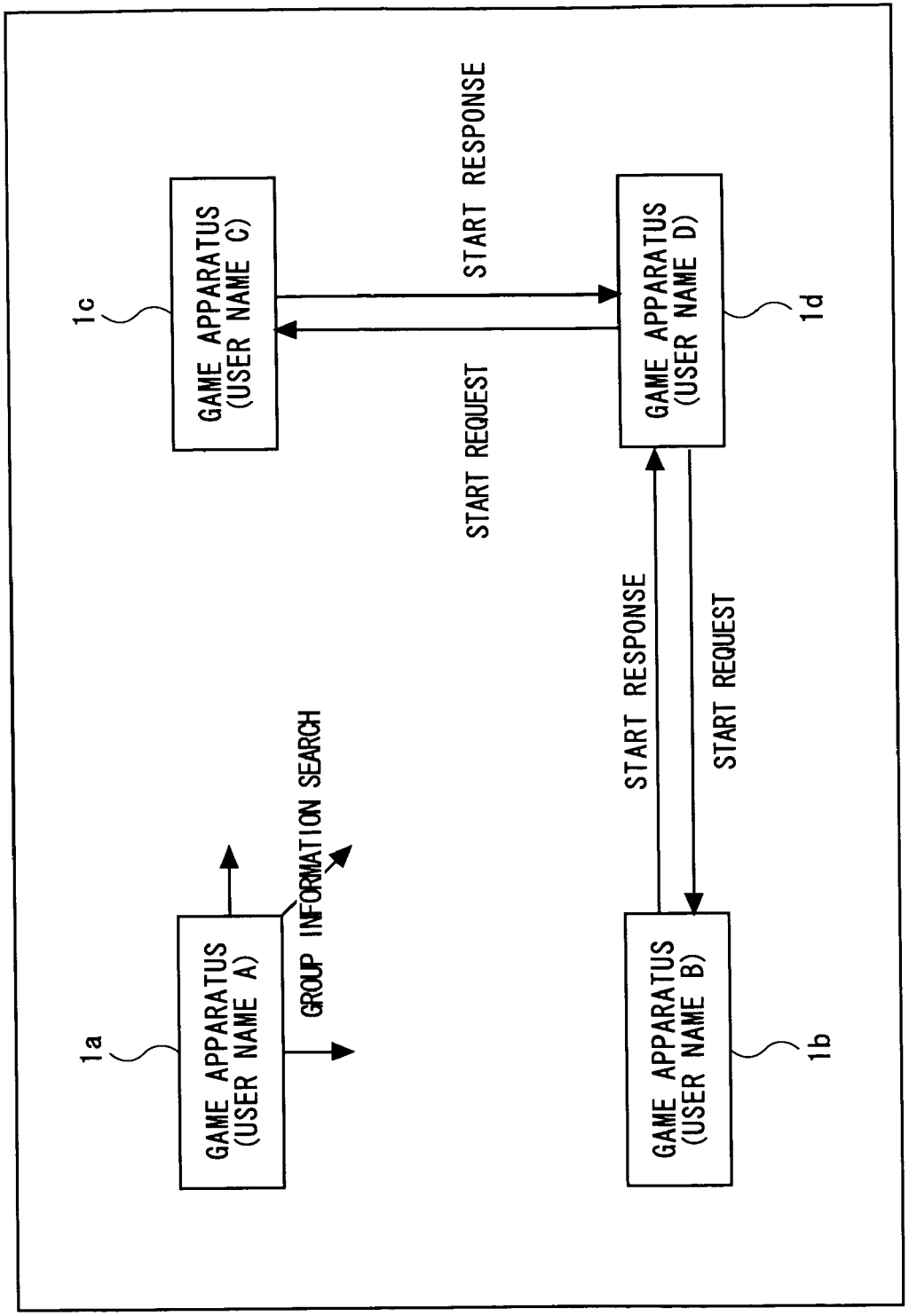
FIG. 15 is a schematic diagram showing a situation in which a game start request and a game start response are transmitted/received by the game apparatuses 1 as shown in FIG. 12.

Next, the host game apparatus 1 transmits a game start request to the guest game apparatus 1 of the group to which the host game apparatus 1 belongs by using wireless communication, and the guest game apparatus 1 transmits a game start response to the host game apparatus 1. FIG. 15 is an exemplary illustrative schematic diagram showing a situation in which a game start request and a game start response are transmitted/received by the game apparatuses 1 as shown in FIG. 12.

Figure 16:
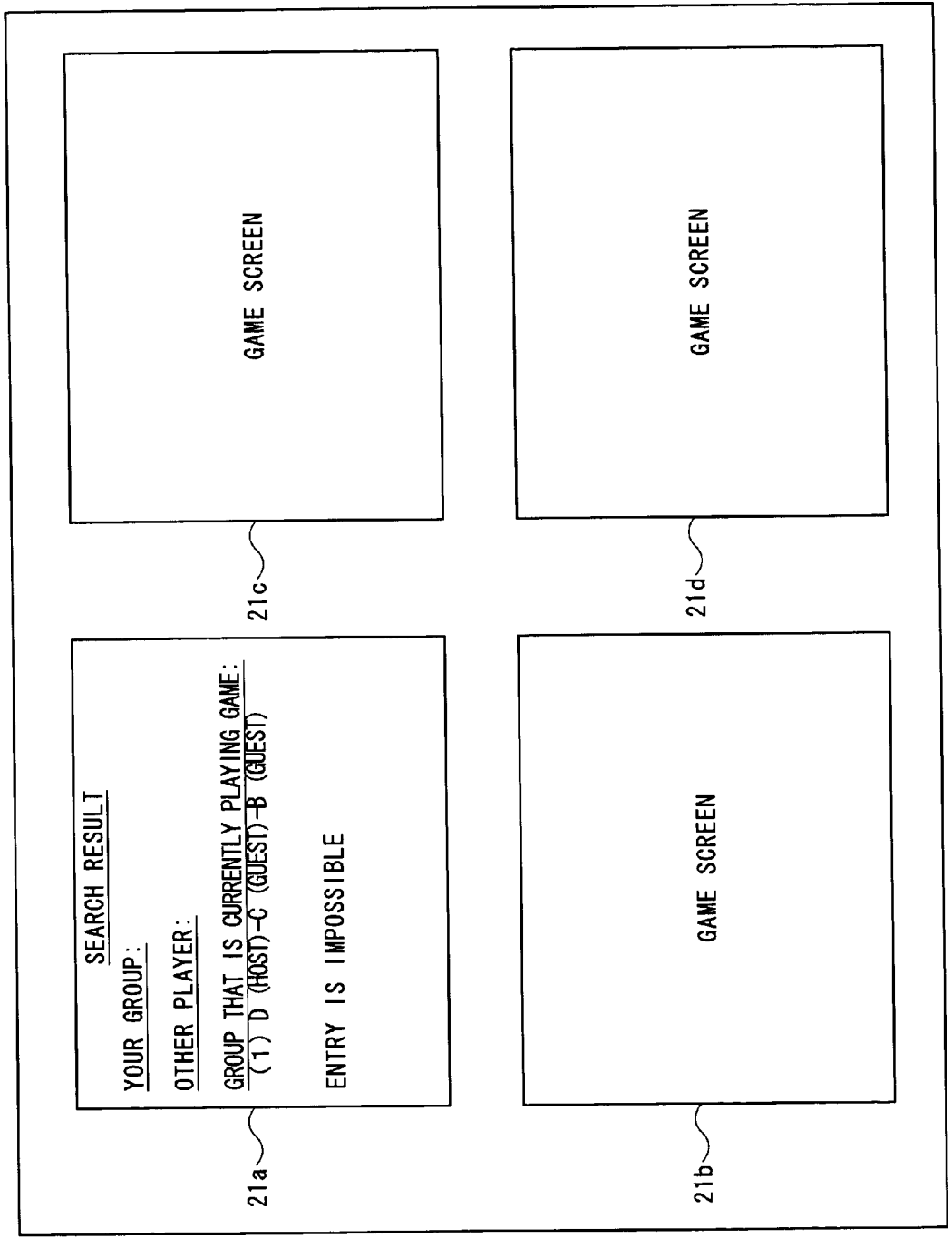
FIG. 16 shows exemplary screens displayed on the LCDs 21a to 21d of the respective game apparatuses 1a to 1d after the game start request and the game start response as shown in FIG. 15 are transmitted.

In FIG. 15, the host game apparatus 1d transmits a game start request to the guest game apparatuses 1b and 1c by using wireless communication. The guest game apparatuses 1b and 1c each transmit a game start response to the host game apparatus 1d by using wireless communication in response to the above game start request. Note that the game apparatus 1a continues the group information search. FIG. 16 shows exemplary screens displayed on the LCDs 21a to 21d of the respective game apparatuses 1a to 1d after the game start request and the game start response as shown in FIG. 15 are performed.

In FIG. 16, on the LCDs 21b to 21d of the respective game apparatuses 1b to 1d by which a group is formed and a game is started, a game screen according to the game progress is displayed. On the other hand, in the search result as displayed on the LCD 21a of the game apparatus 1a, nothing is displayed in "YOUR GROUP" and "OTHER PLAYER", and "D (HOST)-C (GUEST)-B (GUEST)" is displayed in the category of "GROUP THAT IS CURRENTLY PLAYING GAME". Note that apparatus 1a is not allowed to transmit an entry request to the group which has already started a game. Thus, on the LCD 21a, a message reading "entry is impossible" is displayed since another game apparatus 1 which is not currently involved in a game is not present in the above range.

Note that, in the case where a player is allowed to enter a game after it has started, the player is able to transmit an entry request to the group in which the game has already started. Also, in the situation as shown in FIG. 14, if the player D of the game apparatus 1d desires to play the multiplayer game in a group of four, he/she may postpone starting the game to wait for the player A of the game apparatus 1a to enter his/her group.

As such, in each game apparatus 1 in the game system of the illustrative embodiments, not only the makeup of the group to which the game apparatus belongs but also the makeup of other groups present in a range where wireless communication is available is displayed (for example, see FIG. 9). Thus, the player operating the game apparatus 1 is allowed to consider various combinations of available players to form a desired group.

Figure 17:
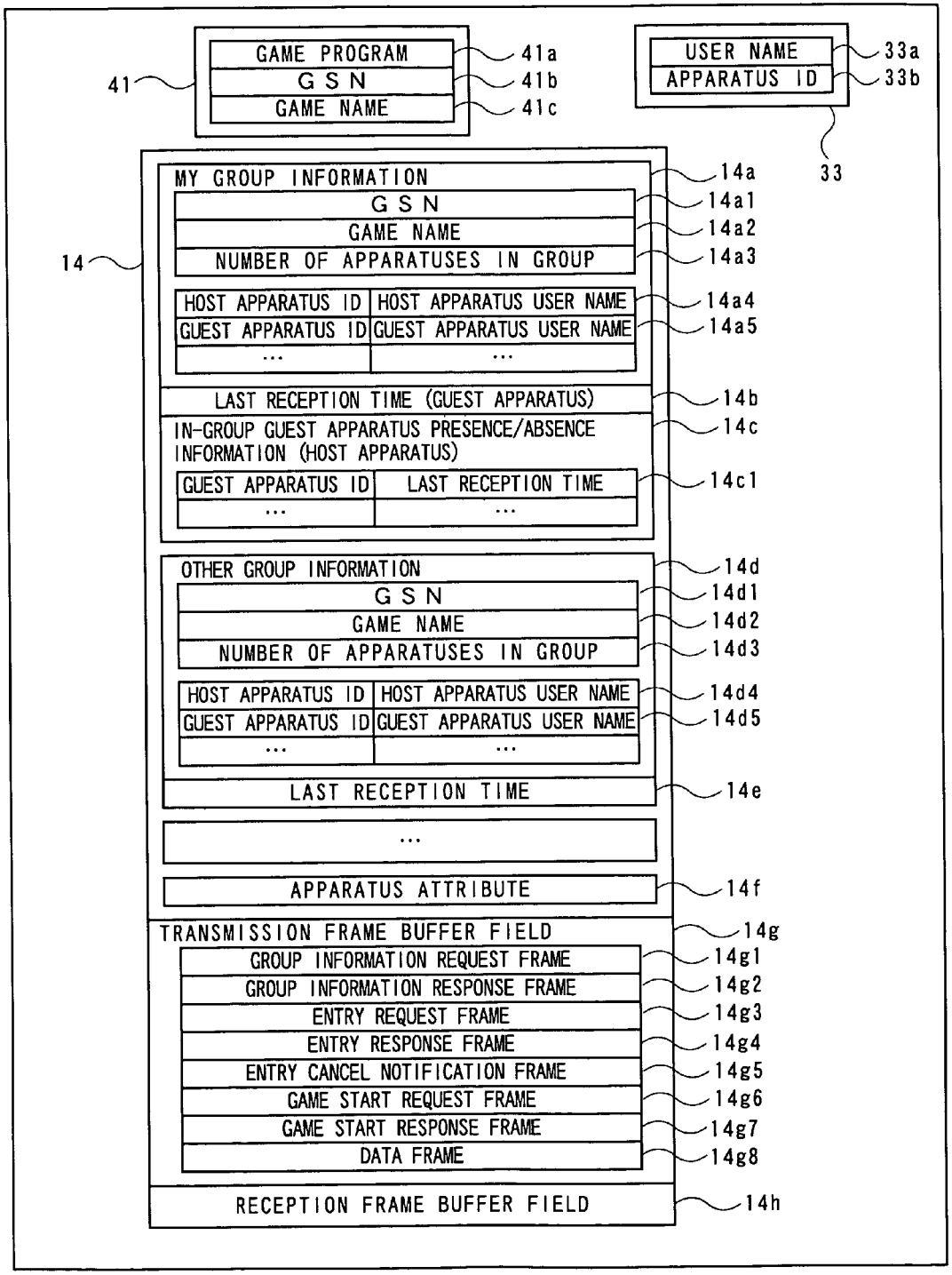
FIG. 17 is an illustration for describing an image of data stored in a WRAM 14, a ROM 41, and an EEPROM 33 as shown in FIG. 2.

Next, with reference to FIG. 17, an exemplary image of data stored in the WRAM 14, the ROM 41, and the EEPROM 33 will be described. Note that FIG. 17 is an image illustration of a data map stored in each of the WRAM 14, the ROM 41, and the EEPROM 33.

In one illustrative embodiment, the ROM 41 of the cartridge 4 fixedly store a game program 41a, a GSN 41b, and a game name 41c. The EEPROM 33 store a user name 33a inputted by a user and an apparatus ID 33b in a nonvolatile manner.

Further, the WRAM 14 stores MY Group information 14a, OTHER Group information 14d, a last reception time 14e which is assigned to the OTHER Group information 14d, and an apparatus attribute 14f, and a transmission frame buffer field 14g and a reception frame buffer field 14h are formed in a portion of the WRAM 14. Also, in the case where the apparatus attribute 14f is a guest apparatus, a last reception time 14b is assigned to the MY GROUP information 14a of the WRAM 14. Further, in the case where the apparatus attribute 14f is a host apparatus, in-group guest apparatus presence/absence information 14c is stored in the WRAM 14.

In the MY Group information 14a, exemplary illustrative information on a group to which the game apparatus belongs (hereinafter, referred to as MY group) is described. Specifically, a GSN 14a1, a game name 14a2, a number of in-group apparatuses (in-group apparatus number) 14a3, a host apparatus ID and a host apparatus user name 14a4, and a guest apparatus ID and a guest apparatus user name 14a5 are described in the MY GROUP information 14a. The GSN 14a1 and the game name 14a2 indicate a game type to be played in the MY group. The in-group apparatus number 14a3 indicates the number of game apparatuses 1 belonging to the MY group (including all apparatuses). In the host apparatus ID and the host apparatus user name 14a4, the apparatus ID of the game apparatus 1 which is set as a host apparatus of the My group and the user name inputted by the user of the host game apparatus 1 are described. In the guest apparatus ID and the guest apparatus user name 14a5, the apparatus ID of the game apparatus 1 which is set as a guest apparatus of the MY group and the user name inputted by the user of the guest game apparatus 1 are described. Note that in the case where a group includes a plurality of guest apparatuses, a plurality of guest apparatus IDs and guest apparatus user names 14a5 are stored. Also, in the case where the game apparatus is a host apparatus of the MY group, the apparatus ID 33b and the user name 33a are stored in the host apparatus ID and the host apparatus user name 14a4. Also, in the case where the game apparatus is a guest apparatus of the MY group, the apparatus ID 33b and the user name 33a are stored in any of the guest apparatus IDs and the guest apparatus user names 14a5.

In the case where the game apparatus is a guest apparatus, data transmitted from the host apparatus is stored in the MY GROUP information, and a time at which the MY GROUP information is received is stored in the last reception time 14b. In the case where the game apparatus is a host apparatus, however, the last reception time 14b is not stored.

The in-group guest apparatus presence/absence information 14c is data to be stored only when the game apparatus is a host apparatus. Specifically, the guest apparatus ID of each guest apparatus belonging to the MY group and a last reception time 14c1 at which a transmission frame from each guest apparatus is received are stored in the in-group guest apparatus presence/absence information 14c. This data is used for detecting that transmission from the guest apparatus belonging to the MY group is interrupted for a time period longer than a predetermined time period.

In the OTHER Group information 14d, information on a group which is non-MY group present in a range where wireless communication is available (hereinafter, referred to as OTHER group) is described. Specifically, a GSN 14d1, a game name 14d2, an in-group apparatus number 14d3, a host apparatus ID and a host apparatus user name 14d4, and a guest apparatus ID and a guest apparatus user name 14d5 are described in the OTHER Group information 14d. The GSN 14d1 and the game name 14d2 indicate a game type to be played in the OTHER group. The in-group apparatus number 14d3 indicates the number of game apparatuses 1 belonging to the OTHER group. In the host apparatus ID and the host apparatus user name 14d4, the apparatus ID of the game apparatus 1 set as a host apparatus of the OTHER group and the user name inputted by the user of the host game apparatus 1 are described. In the guest apparatus ID and the guest apparatus user name 14d5, the apparatus ID of the game apparatus 1 set as a guest apparatus of the OTHER group and the user name inputted by the user of the guest game apparatus 1 are described. Data transmitted from other game apparatus 1 is stored in the OTHER GROUP information 14d. Each OTHER Group information 14d stores a last reception time 14e received from other game apparatus 1. Note that, in FIG. 17, the OTHER Group information 14d of one group is shown. However, a plurality of pieces of OTHER Group information 14d may be separately stored according to the number of groups formed in a range where wireless communication is available.

In the apparatus attribute 14f, an attribute indicating whether the game apparatus is a host apparatus, a guest apparatus, or a possible host apparatus is described. Here, a host apparatus refers to a game apparatus playing a major role in the group in the course of the formation of a group for a multiplayer game, and a guest apparatus refers to a game apparatus following the host apparatus in the course of the group formation. However, in this illustrative embodiment, the host apparatus is not supposed to play a major role in the game process after the multiplayer game is started, and the guest apparatus is not supposed to follow the host apparatus in the game process. A possible host apparatus refers to a game apparatus which does not belong to any group (i.e., independent game apparatus). Hereinafter, with reference to FIG. 18, an apparatus attribute 14f set in a game apparatus 1 will be described. Note that FIG. 18 is an illustration showing a transition of the apparatus attribute 14f set in the game apparatus 1.

Figure 18:
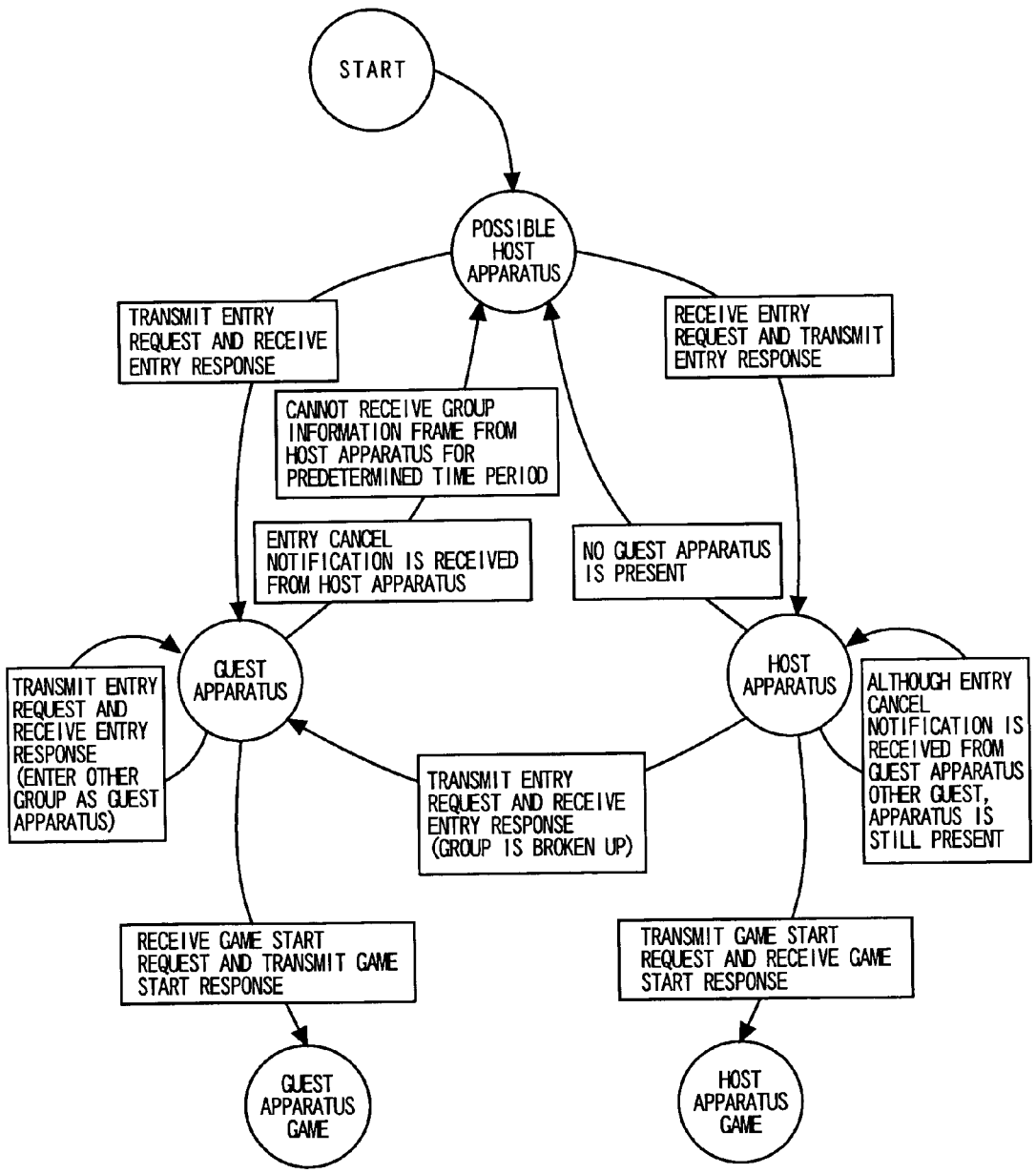
FIG. 18 is an illustration showing a transition of an apparatus attribute 14f set in the game apparatus 1 as shown in FIG. 1.

In FIG. 18, immediately after the group formation is started, the apparatus attributes 14f of all game apparatuses 1 are set to a possible host apparatus. In the case where the game apparatus 1 set to a possible host apparatus receives an entry request from other game apparatus and transmits an entry permit response, the apparatus attribute 14f is set to a host apparatus. On the other hand, in the case where the game apparatus 1 set to a possible host apparatus transmits an entry request to other game apparatus and receives an entry permit response, the apparatus attribute 14f is set to a guest apparatus.

In the case where the game apparatus 1 set to a host apparatus transmits an entry request to other game apparatus and receives an entry permit response, the apparatus attribute 14f is set to a guest apparatus. To be more specific, the host apparatus breaks up the MY group and enters another group. Also, in the case where no guest apparatus is present in the group to which the game apparatus 1 set to a host apparatus belongs, that is, only the game apparatus 1 remains in the group, the apparatus attribute 14f is set to a possible host apparatus. In the case where, although the game apparatus 1 set to a host apparatus receives an entry cancel notification from a particular guest apparatus, at least one other guest apparatus is present in the MY group, the apparatus attribute 14f is still a host apparatus. In the case where the game apparatus 1 set to a host apparatus transmits a game start request to the guest apparatus belonging to the MY group and receives a game start response from the guest apparatus, the apparatus attribute 14f is still set to a host apparatus, and the game is started.

In the case where the game apparatus 1 set to a guest apparatus transmits an entry request to another game apparatus and receives an entry permit response therefrom, the apparatus attribute 14f is still set to a guest apparatus. To be more specific, the guest apparatus changes a group to which it belongs. Also, in the case where the game apparatus 1 set to a guest apparatus receives an entry cancel notification from the host apparatus of the MY group, or a group information response frame is not transmitted from the host apparatus of the MY group for a predetermined time period (for example, ten seconds), the apparatus attribute 14f is set to a possible host apparatus. In the case where the game apparatus 1 set to a guest apparatus receives a game start request from the host apparatus of the MY group and transmits a game start response to the host apparatus, the apparatus attribute 14f is still set to a guest apparatus, and the game is started.

By referring again to FIG. 17, the transmission frame buffer field 14g stores a group information request frame 14g1, a group information response frame 14g2, an entry request frame 14g3, an entry response frame 14g4, an entry cancel notification frame 14g5, a game start request frame 14g6, a game start response frame 14g7, and a data frame 14g8. When the game apparatus 1 transmits data to another game apparatus, a transmission frame prepared in the transmission frame buffer field 14g is used. Also, the reception frame buffer field 14h is a buffer field for temporarily storing a transmission frame buffer received from other game apparatus. Hereinafter, with reference to FIGS. 19 to 26, a structure of each transmission frame will be described.

Figure 19:
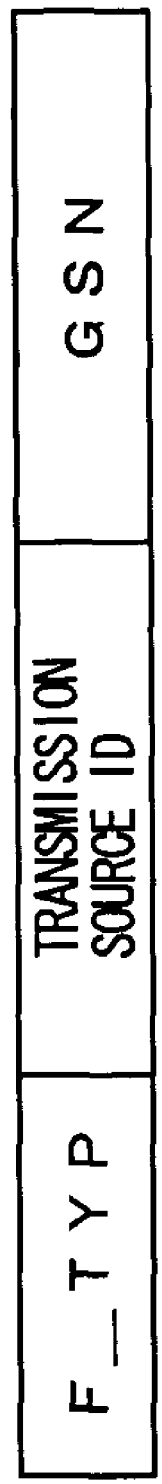
FIG. 19 is an illustration showing one example of a group information request frame.

FIG. 19 shows one exemplary illustrative group information request frame. The group information request frame includes a frame type F_TYP, a transmission source ID, and a GSN. The frame type F_TYP indicates a type of the transmission frame. In this case, information on the group information request frame is described in the frame type F_TYP. In the transmission source ID, the apparatus ID 33b of the game apparatus 1 transmitting the group information request frame is described. In the GSN, the GSN 41b of the game apparatus 1 transmitting the group information request frame is described. That is, the GSN described in the group information request frame indicates a game name executable by the cartridge 4 currently inserted into the game apparatus 1.

Figure 27:
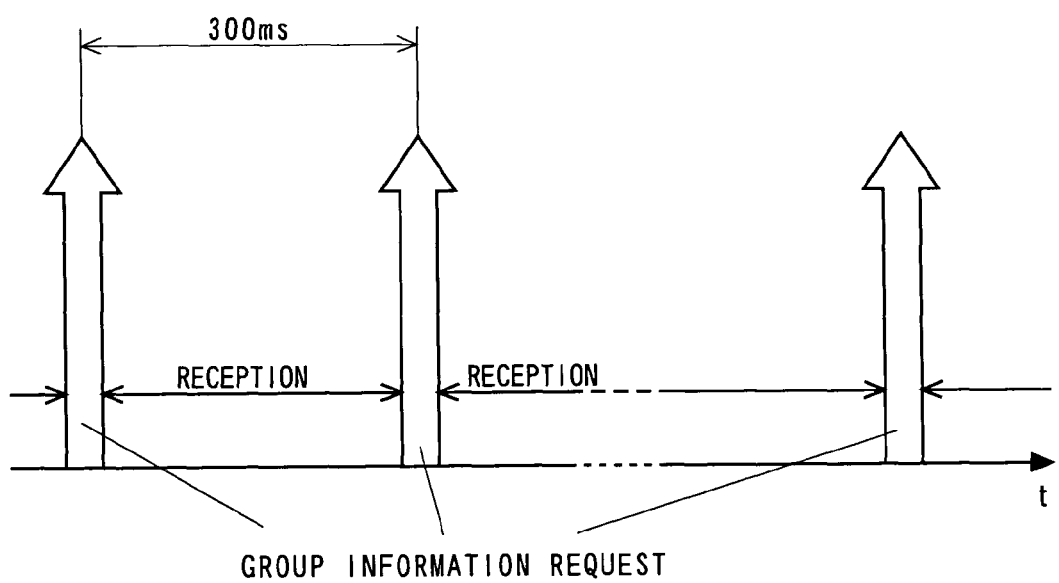
FIG. 27 is an illustration showing a situation in which a group information request frame as shown in FIG. 19 is transmitted at regular intervals.

As shown in FIG. 27, the group information request frame is transmitted from all game apparatuses 1 (all of the host apparatuses, the possible host apparatuses, and the guest apparatuses) at regular intervals every time a predetermined time period (e.g., 300 ms) has elapsed. The group information request frame is broadcast without no destination. Specifically, the group information request frame is transmitted to all game apparatuses 1 present in a communication available range. However, only a host apparatus or a possible host apparatus responds to the transmitted group information request frame (i.e., a guest apparatus does not responds thereto). In the present example, it is assumed that a host apparatus or a possible host apparatus manages/changes group information. Also, it is assumed that only a host apparatus or a possible host apparatus responds to group information since the game apparatus 1 set to a guest apparatus merely receives group information from a host apparatus or a possible host apparatus. A host apparatus or a possible host apparatus which has received the group information request frame transmits a group information response frame, thereby responding to the group information request frame.

FIG. 20 shows one exemplary illustrative group information response frame. The group information response frame is transmitted from the game apparatus 1 which is a host apparatus or a possible host apparatus received the group information request frame to the game apparatus transmitting the group information request frame. The group information response frame includes a frame type F_TYP, an entry flag EF, a destination ID, a transmission source ID, and group information. In this case, information indicating the group information response frame is described in the frame type F_TYP. The entry flag EF indicates whether or not it is possible to enter the group indicated by the group information response frame. In the destination ID, the apparatus ID of the game apparatus which transmits the above-described group information request frame and is a destination of the group information response frame is described. In the transmission source ID, the apparatus ID 33*b* of the game apparatus 1 transmitting the group information response frame is described. In the group information, the GSN 14*a*1 which is described as the MY Group information 14*a* of the game apparatus 1 which is a transmission source of the group information response frame, the game name 14*a*2, the in-group apparatus number 14*a*3, the host apparatus ID and the host apparatus user name 14*a*4, and the guest apparatus ID and the guest apparatus user name 14*a*5 are described. Note that in the case where a plurality of guest apparatuses are present in the group, a plurality of guest apparatuses ID and guest apparatus user names 14*a*5 are described.

Note that, in the present example, it is assumed that each game apparatus 1 broadcasts a group information request frame, and a host apparatus and a possible host apparatus transmit a group information response frame in response thereto. However, the host apparatus and the possible host apparatus may broadcast MY GROUP information at regular intervals (even if there is no request).

FIG. 21 shows one exemplary illustrative entry request frame. The entry request frame is transmitted from the entry requesting game apparatus 1 to the game apparatus (host apparatus) belonging to the group to which entry is requested or the game apparatus (possible host apparatus) of the player to whom an entry request was directed. The entry request frame includes a frame type F_TYP, a destination ID, a transmission source ID, and a transmission source user name. In the frame type F_TYP, in this case, information indicating the entry request frame is described. In the destination ID, the apparatus ID of the game apparatus (host apparatus) belonging to the group to which entry was requested or the game apparatus (possible host apparatus) of the player to whom an entry request was directed is described. In the transmission source ID, the apparatus ID 33*b* of the game apparatus 1 transmitting the entry request frame is described. In the transmission source user name, the user name 33*a* set to the game apparatus 1 transmitting the entry request frame is described.

FIG. 22 shows one exemplary illustrative entry response frame. The entry response frame is transmitted from the game apparatus 1 which is a host apparatus or a possible host apparatus received the entry request frame to the game apparatus transmitting the entry request frame. The entry response frame includes a frame type F_TYP, a destination ID, a transmission source ID, a result, and group information. In the frame type F_TYP, in this case, information indicating the entry response frame is described. In the destination ID, the apparatus ID of the game apparatus transmitting the entry request frame is described. In the transmission source ID, the apparatus ID 33*b* of the game apparatus 1 which is a host apparatus or a possible host apparatus received the entry request frame is described. The result indicates whether or not entry of the game apparatus transmitting the entry request frame is permitted. In the group information, the GSN 14*a*1 which is described as the MY Group information 14*a* of the game apparatus 1 which is a transmission source of the entry response frame, the game name 14*a*2, the in-group apparatus number 14*a*3, the host apparatus ID and the host apparatus user name 14*a*4, and the guest apparatus ID and the guest apparatus user name 14*a*5 are described. The result of acceptance or rejection of entry of the game apparatus transmitting the above-described entry request frame is reflected in this information. Note that in the case where a plurality of guest apparatuses are present in the group, a plurality of guest apparatus IDs and guest apparatus user names 14*a*5 are described.

FIG. 23 shows one exemplary illustrative entry cancellation frame. The entry cancellation frame is transmitted from the game apparatus 1 which withdraws from the group to which it belongs. The entry cancellation frame includes a frame type F_TYP, a destination ID, and a transmission source ID. In the frame type F_TYP, in this case, information indicating the entry cancellation frame is described. In the case where the game apparatus 1 transmitting the entry cancellation frame is a guest apparatus, the apparatus ID of the host apparatus belonging to the group is described in the destination ID. Also, in the case where the game apparatus 1 transmitting the entry cancellation frame is a host apparatus, the apparatus IDs of all the guest apparatuses belonging to the group are described in the destination ID. Specifically, in the case where a guest apparatus withdraws from the group, the entry cancellation frame is transmitted from the guest apparatus to the host apparatus of the group to which the guest apparatus belongs. On the other hand, in the case where a host apparatus withdraws from the group, the entry cancellation frames of all the guest apparatuses of the group are transmitted from the host apparatus. In the transmission source ID, the apparatus ID 33*b* of the game apparatus 1 is described.

Figure 24:
FIG. 24 is an illustration showing one example of a game start request frame.

FIG. 24 shows one exemplary illustrative game start request frame. When the host apparatus of the group determines that the game is started in the current group, the game start request frame is transmitted from the host game apparatus 1 of the group to the respective guest apparatuses of the group. The game start request frame includes a frame type F_TYP, a destination ID, and a transmission source ID. In the frame type F_TYP, in this case, information indicating the game start request frame is described. In the destination ID, the apparatus IDs of the guest apparatuses belonging to the group are each described. In the transmission source ID, the apparatus ID 33*b* of the host game apparatus 1 transmitting the game start request frame is described.

FIG. 25 shows one exemplary illustrative game start response frame. The game start response frame is transmitted from the respective guest game apparatuses 1 received the above-described game start request frame to the host apparatus of the group to which the guest game apparatuses belong. The game start response frame includes a frame type F_TYP, a destination ID, and a transmission source ID. In the frame type F_TYP, in this case, information indicating the game start response frame is described. In the destination ID, the apparatus ID of the host game apparatus of the group is described. In the transmission source ID, the apparatus IDs 33*b* of the guest game apparatuses 1 transmitting the game start response frame are each described.

FIG. 26 shows one exemplary illustrative data frame. The data frame is transmitted/received by the game apparatuses 1 belonging to the group in which the game is started. The data frame includes a frame type F_TYP, a destination ID, a transmission source ID, and data. In the frame type F_TYP, in this case, information indicating the data frame is described. In the destination ID, the apparatus ID of the game apparatus which is a destination of the data is described. In the transmission source ID, the apparatus ID 33*b* of the game apparatus 1 transmitting the data is described. In the data, game data, etc., to be used in the game progress is described.

Figure 28:
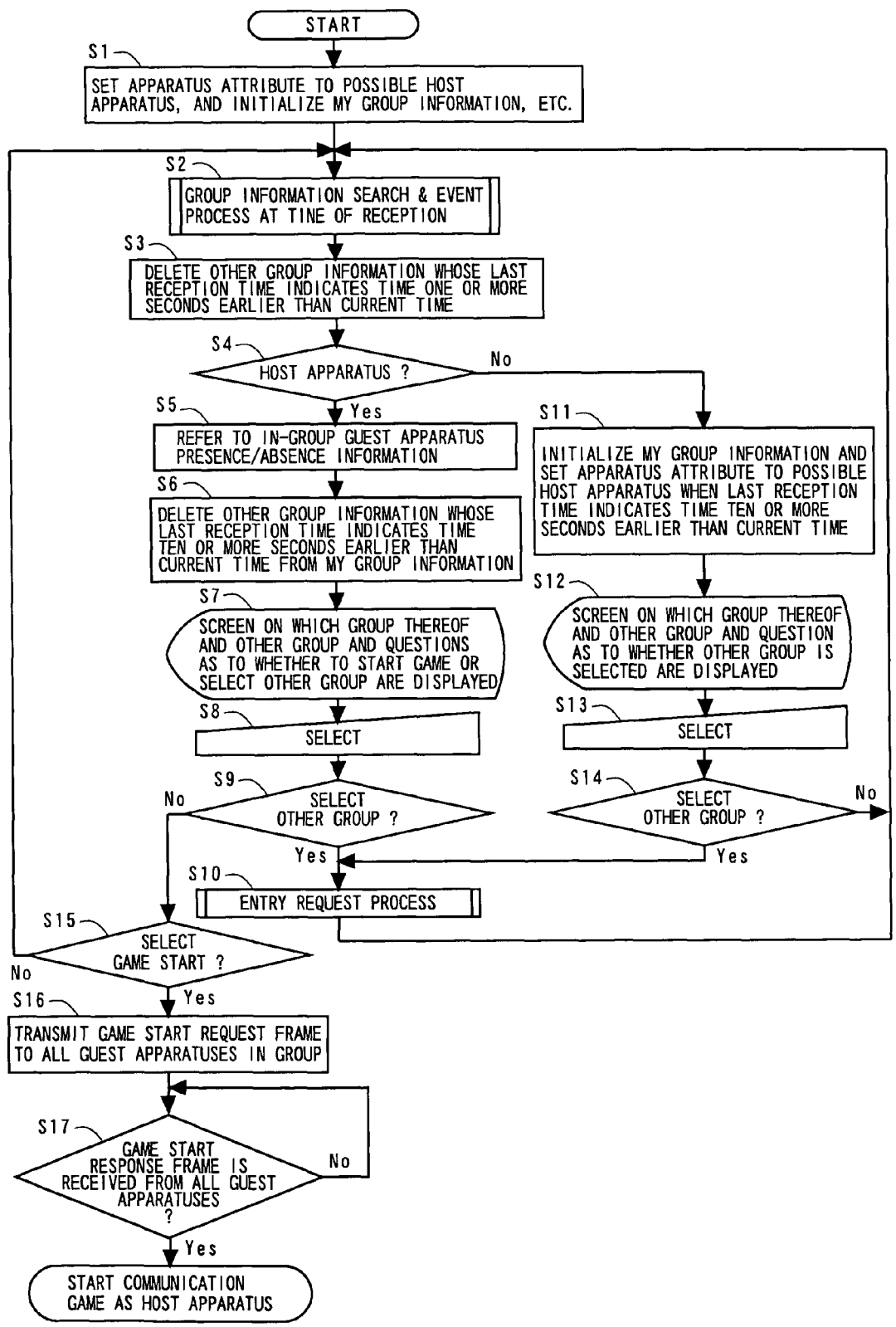
FIG. 28 is a flowchart showing an overall procedure of grouping executed by the game apparatus 1 as shown in FIG. 1.
Figure 29:
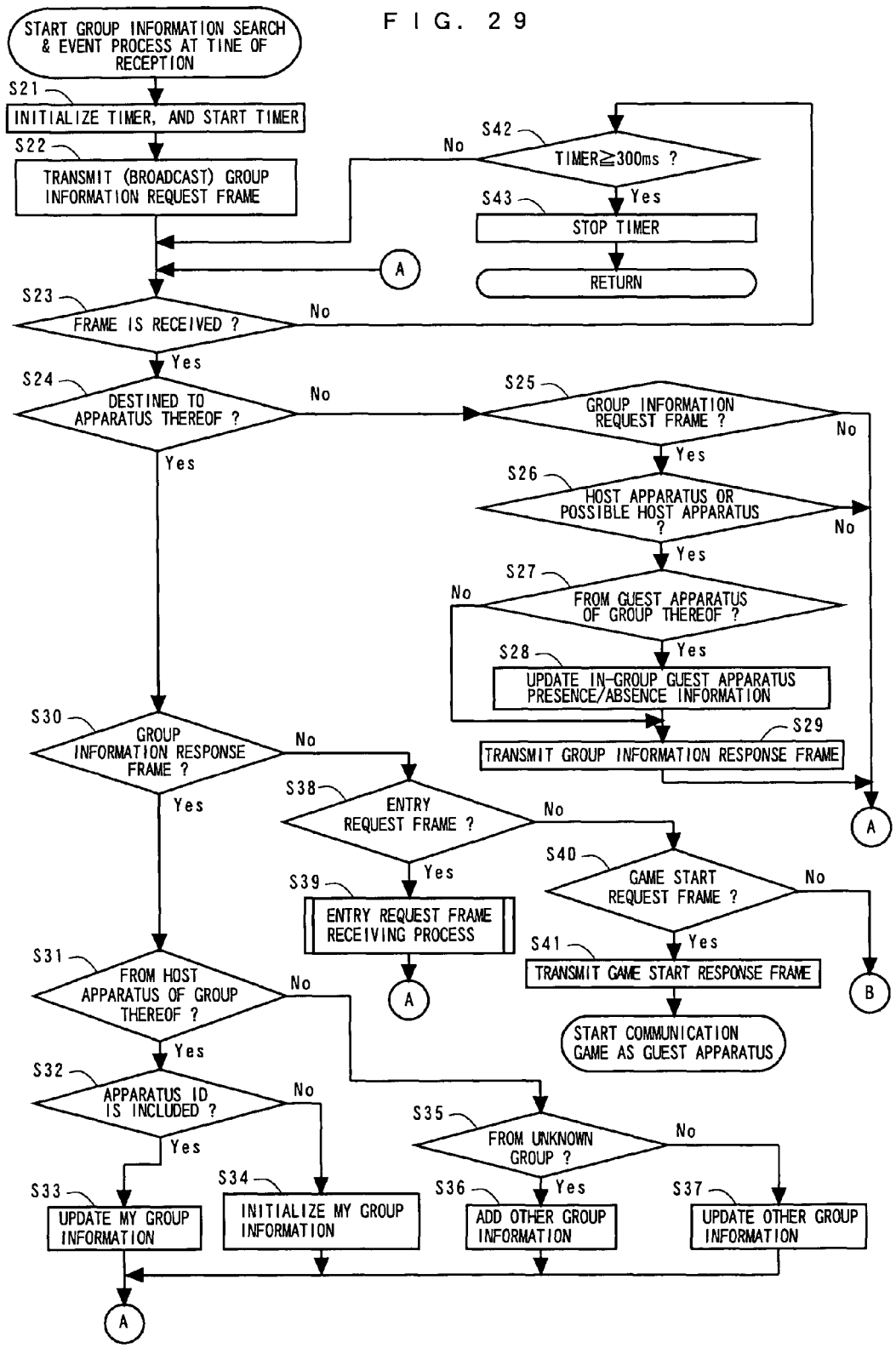
FIG. 29 is a subroutine showing a first half of a detailed procedure of step S2 of FIG. 28.
Figure 30:
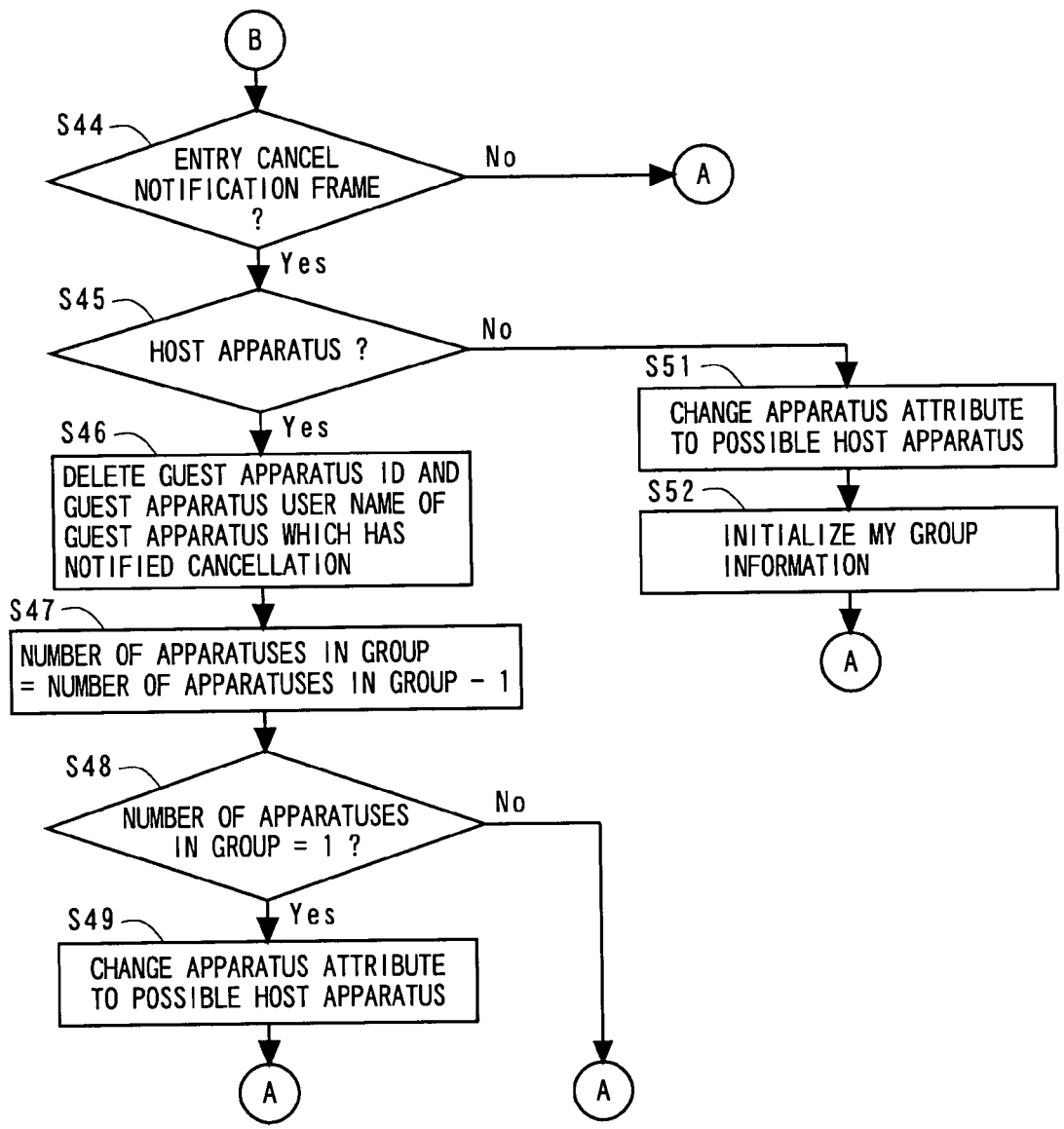
FIG. 30 is a subroutine showing a last half of the detailed procedure of step S2 of FIG. 28.
Figure 32:
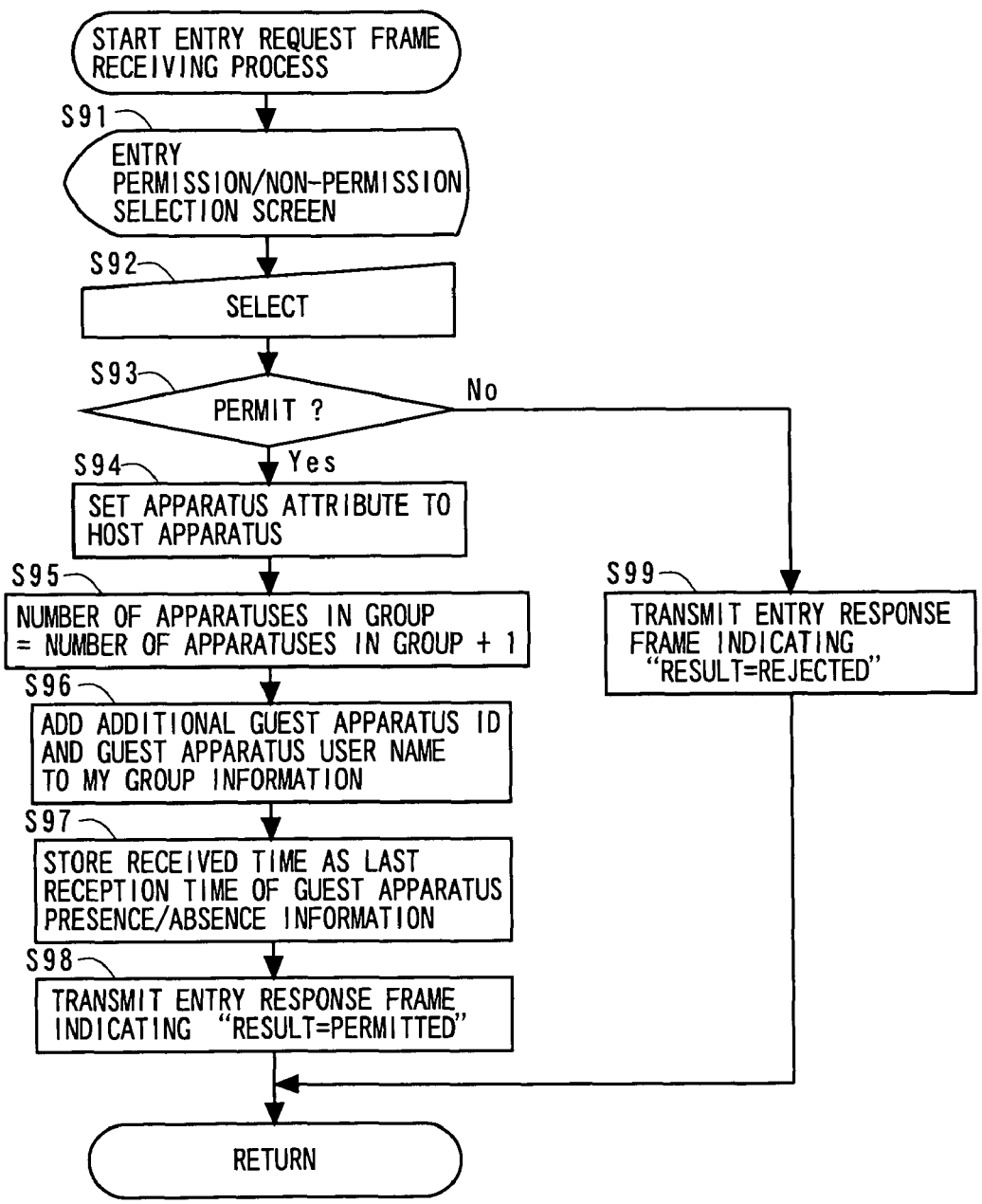
FIG. 32 is a subroutine showing a detailed procedure of step S39 of FIG. 29.

Next, with reference to FIGS. 28 to 32, an exemplary illustrative procedure of grouping among the game apparatuses 1 will be described. FIG. 28 is an exemplary illustrative flowchart showing an overall procedure of grouping executed by the game apparatus 1. FIGS. 29 and 30 are exemplary illustrative subroutines showing a detailed procedure of step S2 of FIG. 28. FIG. 31 is an exemplary illustrative subroutine showing a detailed procedure of step S10 of FIG. 28. FIG. 32 is an exemplary illustrative subroutine showing a detailed procedure of step S39 of FIG. 29. Note that a program for executing these processes is included in the game program 41a. When an exemplary illustrative game main unit 10 is powered ON, the above program is read from the ROM 41 to the WRAM 14, and is executed by the CPU core 11. Note that the program for executing the above processes may be stored in a ROM (not shown) in a wireless unit or a ROM (not shown) in the game main unit 10.

In FIG. 28, when an exemplary game main unit 10 is powered ON, various initialization processes of the game main unit 10 are performed by the program stored in the boot ROM 12, and the program stored in the ROM 41 is read and executed. Firstly, when grouping is started in a range where wireless communication of the game apparatus 1 is available, the game apparatus 1 sets an apparatus attribute to a possible host apparatus, and the apparatus is initialized (step S1). Specifically, the apparatus attribute 14f of the game apparatus 1 is set to a possible host apparatus, and the MY Group information 14a and the OTHER Group information 14d, etc., are initialized. At the time of the above initialization, in the MY Group information 14a, the GSN 41b stored in the ROM 41 is described in the GSN 14a1, the game name 41c stored in the ROM 41 is described in the game name 14a2, the number of apparatuses 1 in the group is described in the in-group apparatus number 14a3, the apparatus ID 33b and the user name 33a stored in the EEPROM 33 are described in the host apparatus ID and the host apparatus user name 14a4. Then, the game apparatus 1 proceeds to a next step.

Next, the game apparatus 1 performs group information search and an event process at the time of reception (step S2). Hereinafter, with reference to FIGS. 29 and 30, a detailed procedure of the group information search and the event process at the time of reception will be described.

In FIG. 29, the game apparatus 1 initializes a timer provided in the peripheral circuit 16 and starts counting by the timer (step S21), and proceeds to a next step. The above-described timer is used for counting 300 ms at step S42, which will be described below.

Next, the game apparatus 1 broadcasts the group information request frame (step S22), and proceeds to a next step. The group information request frame which has been described above by using FIGS. 19 and 27 is a transmission frame to be transmitted from all game apparatuses 1 at regular intervals every time a predetermined time period (e.g., 300 ms) has elapsed, and is broadcast without destination.

Next, the game apparatus 1 determines whether or not a transmission frame is received from another game apparatus (step S23). The above-described waiting for reception of the transmission frame at step S23 is repeated until the timer count, which has started at step S21, reaches 300 ms (step S42). In the case where a transmission frame is received from another game apparatus before the timer count reaches 300 ms, the game apparatus 1 proceeds to a next step S24. Note that the game apparatus 1 has a counter (not shown) for registering a current time and stores a reception time of a transmission frame when the transmission frame is received at step S23 based on an output value of the above counter. On the other hand, in the case where the timer count reaches 300 ms before a transmission frame is received, the game apparatus 1 proceeds to a next step S43.

At step S43, the game apparatus 1 stops the timer which has started counting at the above-described step S21, ends the process in the subroutine, and returns the process to the flowchart as shown in FIG. 28. In the case where a display process, which will be described below, is performed after the process at step S2 as shown in FIG. 28, and the player does not make a choice among the options, the game apparatus 1 goes back to the process at step S2. As a result, the process performed at steps S21 to S23, S42, and S43 are repeated in a cycle of 300 ms, and the group information request frame is transmitted from the game apparatus 1 according to this cycle. That is, the group information request frame is transmitted in a cycle of 300 ms.

On the other hand, at step S24, the game apparatus 1 determines whether or not the received transmission frame is transmitted thereto. At step S24, in the case where the destination ID described in the transmission frame is the apparatus ID 33b thereof, the game apparatus 1 determines that the transmission frame is transmitted thereto, and proceeds to a next step S30. Also, in the case where the destination ID described in the transmission frame is not the apparatus ID 33b thereof, or no destination ID is described, the game apparatus 1 determines that the transmission frame is not transmitted thereto, and proceeds to a next step S25.

At step S25, the game apparatus 1 determines whether or not the received transmission frame is a group information request frame. Then, the game apparatus 1 determines whether the apparatus attribute 14f is set to a host apparatus or a possible host apparatus (step S26). In the case where the received transmission frame is not a group information request frame, or the apparatus attribute 14f is set to a guest apparatus, the game apparatus 1 goes back to the above-described step S23, and repeats the process. On the other hand, in the case where the received transmission frame is a group information request frame, and the apparatus attribute 14f is set to a host apparatus or a possible host apparatus, the game apparatus 1 determines whether or not it is a group information request frame from a guest apparatus of the MY group (step S27). In the case where it is a group information request frame from a guest apparatus of the MY group, the game apparatus 1 updates the reception time of the group information request frame stored at the time of reception of the group information request frame at step S23 as the last reception time 14c1 of the guest apparatus, which is stored in the in-group guest apparatus presence/absence information 14c (step S28), and proceeds to a next step S29. On the other hand, in the case where it is not a group information request frame from a guest apparatus of the MY group, the game apparatus 1 directly proceeds to a next step S29.

At step S29, the game apparatus 1 transmits a group information response frame, goes back to the above-described step S23, and repeats the process. In the group information of the group information response frame which has been described by using FIG. 20, the game apparatus 1 describes the MY Group information 14a stored in the WRAM 14 thereof. In the destination ID, the game apparatus 1 describes the transmission source ID described in the group information request frame received at step S23. According to the current game progress, the game apparatus 1 describes, in the entry flag EF, whether or not entry to the group to which it belongs is possible. Note that, in the present example, an entry flag is turned OFF (i.e., entry is impossible) if the game is started.

In the case where the received transmission frame is transmitted thereto, the game apparatus 1 determines whether or not the received transmission frame is a group information response frame (step S30), an entry request frame (step S38), a game start request frame (step S40), or an entry cancel notification frame (step S44: FIG. 30). In the case where the received transmission frame is none of the above frames, the game apparatus 1 goes back to the above-described step S23, and repeats the process.

In the case where a group information response frame is received from other game apparatus (YES at step S30), the game apparatus 1 determines whether or not the group information response frame is transmitted from the host apparatus of the MY group (step S31), and is transmitted from a host apparatus of a new group or a new possible host apparatus (independent game apparatus 1 which does not form a group) (step S35). In the case where the group information response frame is transmitted from the host apparatus of the MY group (YES at step S31), the game apparatus 1 determines whether or not the apparatus ID thereof is included in the guest apparatus ID of the group information in the received group information response frame (step S32). In the case where the apparatus ID is included therein, the game apparatus 1 updates the MY Group information 14*a* stored in the WRAM 14 to the group information described in the group information response frame received at step S23, updates the reception time of the group information response frame stored at the time of reception of the group information response frame as the last reception time 14*b* assigned to the MY Group information 14*a* (step S33), goes back to the above-described step S23, and repeats the process. On the other hand, in the case where the apparatus ID is not included therein, the game apparatus 1 determines that deletion thereof from the group is performed by the host apparatus, initializes the MY Group information 14*a* stored in the WRAM 14 thereof, sets the apparatus attribute to a possible host apparatus (step S34), goes back to the above-described step S23, and repeats the process. Note that the initialization of the MY Group information 14*a* is identical to the above-described step S1, and a detailed description thereof is omitted.

Also, in the case where the group information response frame is transmitted from the host apparatus of the new group or the new possible host apparatus (YES at step S35), the game apparatus 1 adds new OTHER Group information 14*d* to the WRAM 14 using the group information described in the group information response frame received at step S23, updates the reception time of the group information response frame stored at the time of reception of the group information response frame as the last reception time 14*e* assigned to the new OTHER Group information 14*d* (step S36), goes back to the above-described step S23, and repeats the process. Also, in the case where the group information response frame is transmitted from a known host apparatus of other group or a known possible host apparatus (NO at steps S31 and S35), the game apparatus 1 updates the corresponding OTHER Group information 14*d* stored in the WRAM 14 to the group information described in the group information response frame received at step S23, updates the reception time of the group information response frame stored at the time of reception of the group information response frame as the last reception time 14*e* assigned to the OTHER Group information 14*d* (step S37), goes back to the above-described step S23, and repeats the process. That is, by the process performed at steps S31 to S37, the MY Group information 14*a* and the OTHER Group information 14*d* stored in the WRAM 14 of the game apparatus 1 are updated to the group information provided for other possible host apparatus and a host apparatus of each group. At steps S33, S36, and S37, when the group information is updated, the reception time of the group information response frame stored at the time of reception of the group information response frame received at step S23 is updated as the last reception time assigned to each group information.

In the case where the game apparatus 1 receives an entry request frame from another game apparatus (YES at step S38), the game apparatus 1 performs an entry request frame reception process (step S39), goes back to the above-described step S23, and repeats the process. Hereinafter, with reference to FIG. 32, a detailed exemplary procedure of the entry request frame reception process will be described.

In FIG. 32, an entry permission/non-permission selection screen is displayed on the LCD 21 of the game apparatus 1 (step S91). The entry permission/non-permission selection screen is, for example, a screen to be displayed on the LCDs 21*a* and 21*d* as shown in FIG. 6 so as to display a user name of the game apparatus transmitting the entry request frame and a message reading "entry is permitted?". The player of the game apparatus 1 selects whether or not to permit the entry of the entry requesting user by operating the operating switch 22 while checking the options on the entry permission/non-permission selection screen displayed on the LCD 21 (step S92). The game apparatus 1 determines whether or not the entry is permitted at the above-described step S92 (step S93). If entry is permitted, the game apparatus 1 proceeds to a next step S94. On the other hand, if entry is not permitted, the game apparatus 1 proceeds to a next step S99.

At step S94, the game apparatus 1 sets the apparatus attribute 14*f* to a host apparatus. Next, the game apparatus 1 increments the in-group apparatus number 14*a*3 of the MY Group information 14*a* stored in the WRAM 14 by +1 (step S95). Then, the game apparatus 1 adds the transmission source ID and the transmission source user name indicated by the received entry request frame to the guest apparatus ID and the guest apparatus user name 14*a*5 of the MY Group information 14*a* (step S96). Next, the reception time of the entry request frame stored at the time of reception of the entry request frame received at step S23 is stored as the last reception time 14*c*1 of the guest apparatus, which is stored in the in-group guest apparatus presence/absence information 14*c* (step S97). Next, the game apparatus 1 transmits the entry response frame as shown in FIG. 22 to the entry requesting game apparatus (step S98), and ends the process in the subroutine. Note that the game apparatus 1 describes the transmission source ID of the above-described entry request frame in the destination ID of the entry response frame to be transmitted, describes "permit" in the result, and describes the MY Group information 14*a* updated at the above-described steps S95 and S96 in the group information.

On the other hand, at step S99, the game apparatus 1 transmits the entry response frame as shown in FIG. 22 to the entry requesting game apparatus, and ends the process in the subroutine. Note that the game apparatus 1 describes the transmission source ID of the above-described entry request frame in the destination ID of the entry response frame to be transmitted, describes "not permit" in the result, and describes the currently stored MY Group information 14*a* in the group information.

By referring again to FIG. 29, in the case where the game apparatus 1 receives a game start request frame from another game apparatus (YES at step S40), the game apparatus 1 transmits the game start response frame as shown in FIG. 25 to the transmission source of the game start request frame (i.e., the host apparatus of the MY group) (step S41). Then, the game apparatus 1 starts a communication game as a guest apparatus in the MY group, and ends grouping among the game apparatuses 1.

In FIG. 30, in the case where the game apparatus 1 receives an entry cancel notification frame from another game apparatus (YES at step S44), the game apparatus 1 determines whether or not the apparatus attribute 14*f* is set to a host apparatus (step S45). In the case where the apparatus attribute 14*f* is set to a host apparatus, the game apparatus 1 proceeds to a next step S46. On the other hand, in the case where the apparatus attribute 14*f* is set to a guest apparatus, the game apparatus 1 proceeds to a next step S51.

At step S45, the apparatus attribute 14*f* is determined to be a host apparatus when the host apparatus receives an entry cancel notification from the guest apparatus of the MY group. In this case, at step S46, the game apparatus 1 deletes the guest apparatus ID and the guest apparatus user name 14*a*5 of the guest apparatus, which is a transmission source of the entry cancel notification frame, from the MY Group information 14*a* (step S46). The game apparatus 1 decrements the in-group apparatus number 14*a*3 of the MY Group information 14*a* by −1 (step S47), and determines whether or not the updated in-group apparatus number 14*a*3 is equal to 1 (step S48). In the case where the updated in-group apparatus number 14*a*3 is equal to or greater than 2, the game apparatus 1 goes back to the above-described step S23 and repeats the process. On the other hand, in the case where the updated in-group apparatus number 14*a*3 is equal to 1, the game apparatus 1 changes the apparatus attribute 14*f* to a possible host apparatus (step S49), goes back to the above-described step S23, and repeats the process.

On the other hand, at step S45, the apparatus attribute 14*f* is determined to be a guest apparatus when the guest apparatus receives an entry cancel notification from the host apparatus of the MY group (i.e., when the MY group is broken up since the host apparatus of the My group moves to another group). In this case, at step S51, the game apparatus 1 changes the apparatus attribute 14*f* to a possible host apparatus. The game apparatus 1 initializes the MY Group information 14*a* (step S52), goes back to the above-described step S23, and repeats the process. Note that the initialization of the MY Group information 14*a* performed at step S52 is identical to the above-described step S1, and a detailed description thereof is omitted.

By referring again to FIG. 28, after the group information search and the event process at the time of reception are performed at step S2, the game apparatus 1 deletes OTHER Group information 14*b* to which the last reception time 14*e*, which is stored in the WRAM 14 thereof, a predetermined time period (e.g., one second) earlier than the current time is assigned (step S3). Note that the current time is determined based on the output value from the counter (not shown) for registering the current time. The above-described process is performed for deleting pre-change OTHER GROUP information when a group formation status of another group is changed.

Note that, at step S3, when particular OTHER GROUP information is not received for a time period equal to or greater than one second, such OTHER GROUP information is deleted. On the other hand, at step S6, which will be described below, the host apparatus deletes data of a particular guest apparatus from the MY GROUP information when transmission from the guest apparatus is not performed for a time period equal to or greater than ten seconds. Also, at step S11, which will be described below, the guest apparatus initializes the MY GROUP information when group information is not received from the host apparatus for a time period equal to or greater than ten seconds. As described above, in the deletion process (step S3) for deleting other group when OTHER GROUP information thereof is not received and the change process (steps S6 and S11) for changing MY GROUP information when no transmission is performed from the host apparatus or the guest apparatus of the same group, a reference time period in the former case is set so as to be shorter than that in the latter case for the following reasons: As described above, information of another group can be received in a cycle of 300 ms. Thus, even if information of other group is deleted since it is unreceivable for a time period equal to or greater than one second due to occurrence of some communication failure, there is no problem because the above information can be received again when the communication failure has been resolved. Also, if nonexistent OTHER GROUP information is left undeleted for a relatively long time, such nonexistent OTHER GROUP information may be inconveniently allowed to be displayed on the display means and selected. Thus, in one illustrative embodiment the deletion process for deleting OTHER GROUP information requires a relatively short time period to make a determination. On the other hand, it is preferable to retain MY GROUP information as it is for a while even if communication between a host apparatus and a guest apparatus becomes impossible due to communication failure. Once MY GROUP information is changed against the player's will due to unforeseen communication failure, he/she is inconveniently required to re-start the group formation process. Thus, the change process for changing MY GROUP information requires a relatively long time period to make a determination.

Next, the game apparatus 1 determines whether or not the apparatus attribute 14*f* is set to a host apparatus (step S4). In the case where the apparatus attribute 14*f* is set to a host apparatus, the game apparatus 1 proceeds to a next step S5. On the other hand, in the case where the apparatus attribute 14*f* is set to a possible host apparatus or a guest apparatus, the game apparatus 1 proceeds to a next step S11.

At step S5, the game apparatus 1 set to a host apparatus refers to the in-group guest apparatus presence/absence information 14*c*. Next, the game apparatus 1 deletes a guest apparatus indicating the last reception time 14*c*1, which is stored in the in-group guest apparatus presence/absence information 14*c*, a predetermined time period (e.g., ten seconds) earlier than the current time from the MY Group information 14*a* (step S6), and proceeds to a next step. Specifically, in the case where the host apparatus does not receive data from the guest apparatus of the MY group for a time period equal to or greater than ten seconds, the guest apparatus is deleted from the MY group.

Next, on the LCD 21 of the game apparatus 1 whose apparatus attribute 14*f* is set to a host apparatus, my group and other groups, other players (a player or players that do not belong to any group), game start, and options for entry to another group or connection to another player are displayed (step S7). For example, a display at the above-described step S7 is shown in the screen displayed on the LCDs 21*a* and 21*d* as indicated in FIG. 9. The player of the game apparatus 1 makes a selection by operating the operating switch 22 while checking the options displayed on the LCD 21 (step S8). At the above-described step S8, the game apparatus 1 determines whether or not entry to another group (or connection to another player) is selected (step S9), and whether or not game start is selected (step S15). In the case where neither option is selected, the game apparatus 1 goes back to the above-described step S2, and repeats the process. On the other hand, in the case where entry to another group (or connection to another player) is selected (YES at step S9), the game apparatus 1 proceeds to a next step S10. In the case where game start is selected (YES at step S15), the game apparatus 1 proceeds to a next step S16.

On the other hand, at step S11, when the last reception time 14*b* assigned to the MY Group information 14*a* is a predetermined time period (e.g., ten seconds) earlier than the current time, the game apparatus 1 whose apparatus attribute 14*f* is set to a possible host apparatus or a guest apparatus initializes the MY Group information 14*a*, sets the apparatus attribute 14*f* to a possible host apparatus, and proceeds to a next step. Specifically, when the guest apparatus does not receive data from the host apparatus of the MY group for a time period equal to or greater than ten seconds, the game apparatus 1 initializes the MY group. Note that the game apparatus 1 whose apparatus attribute 14*f* is set to a possible host apparatus directly proceeds to a next step since the last reception time 14*b* is not stored.

Next, on the LCD 21 of the game apparatus 1, my group, other groups, other players, and an option for entry to another group or connection with another player are displayed (step S12). For example, a display at step S12 is shown in the screen displayed on the LCDs 21*b* and 21*c* as indicated in FIG. 9. The player of the game apparatus 1 makes a selection by operating the operating switch 22 while checking the option displayed on the LCD 21 (step S13). At the above-described step S13, the game apparatus 1 determines whether or not entry to another group (or connection with another player) is selected (step S14). In the case where the option is not selected, the game apparatus 1 goes back to the above-described step S2, and repeats the process. On the other hand, in the case where entry to another group (or connection with another player) is selected (YES at step S14), the game apparatus 1 proceeds to a next step S10.

Note that the processes at the above-described steps S3, S5, S6, and S11 are performed for deleting OTHER GROUP information that once existed but has disappeared, performed by the host apparatus for deleting the game apparatus that has been a guest apparatus of MY group but moved outside the available communication range or has been powered OFF from the MY group, or performed by the guest apparatus for deleting MY group (breaking up the group) when the host apparatus of the MY group has moved outside the available communication range or has been powered OFF.

In the case where entry to another group (or connection to another player) is selected at the above-described step S9 or S14, the game apparatus 1 performs the entry request process (step S10), goes back to the above-described step S2, and continues the process. Hereinafter, with reference to FIG. 31, a detailed exemplary procedure of the entry request process at the above-described step S10 will be described.

In FIG. 31, the game apparatus 1 transmits an entry request frame to the host apparatus belonging to the group to which entry was requested selected at step S8 or S13 or other player with whom connection was requested (possible host apparatus) (step S71), and proceeds to a next step. In the entry request frame which has been described using FIG. 21, the game apparatus 1 describes the host apparatus ID of the above-described host apparatus or possible host apparatus. As such a host apparatus ID, a description in the host apparatus ID and the host apparatus user name 14*d*4 of the entry requested OTHER Group information 14*d* is utilized. The game apparatus 1 describes the apparatus ID 33*b* and the user name 33*a* in the transmission source ID and the transmission source user name, respectively, of the entry request frame.

Next, the game apparatus 1 determines whether or not an entry response frame is received from the game apparatus 1 to which the entry request has been transmitted (step S72). The game apparatus 1 continues the process at the above-described step S72 until an entry response frame is received. When an entry response frame is received, the game apparatus 1 proceeds to a next step S73.

At step S73, the game apparatus 1 determines whether or not entry to the group is permitted in the entry response frame which has been received at the above-described step S72 (by referring to data in "result"). In the case where entry is permitted, the game apparatus 1 proceeds to a next step. On the other hand, in the case where entry is rejected, the game apparatus 1 ends the process in the subroutine.

Next, the game apparatus 1 determines whether or not the apparatus attribute 14*f* is set to a host apparatus (step S74), and whether or not the apparatus attribute 14*f* is set to a guest apparatus (step S76). In the case where the apparatus attribute 14*f* is set to neither a host apparatus nor a guest apparatus, i.e., the apparatus attribute 14*f* is set to a possible host apparatus (NO at step S76), the game apparatus 1 proceeds to a next step S78.

In the case where the apparatus attribute 14*f* is set to a host apparatus (YES at step S74), the game apparatus 1 transmits an entry cancel notification frame to all guest apparatuses of the MY group (step S75), and proceeds to a next step S78. In the entry cancel notification frame which has been described using FIG. 23, the game apparatus 1 describes all guest apparatus IDs described in the guest apparatus ID and the guest apparatus user name 14*a*5 of the MY Group information 14*a* in the destination ID. On the other hand, in the case where the apparatus attribute 14*f* is set to a guest apparatus (YES at step S76), the game apparatus 1 transmits the entry cancel notification frame to the host apparatus of the MY group (step S77), and proceeds to a next step S78. In the entry cancel notification frame which has been described using FIG. 23, the game apparatus 1 describes the host apparatus ID described in the host apparatus ID and the host apparatus user name 14*a*4 of the MY Group information 14*a* in the destination ID.

At step S78, the game apparatus 1 deletes the currently described MY Group information 14*a* to replace it with the group information described in the entry response frame received at step S72. The game apparatus 1 sets the apparatus attribute 14*f* to a guest apparatus (step S79), and ends the process in the subroutine.

By referring again to FIG. 28, in the case where game start is selected (YES at step S15), the game apparatus 1 transmits a game start request frame to all guest apparatuses belonging to the MY group (step S16). In the game start request frame which has been described using FIG. 24, the game apparatus 1 describes all guest apparatus IDs described in the guest apparatus ID and the guest apparatus user name 14*a*5 of the MY Group information 14*a* in the destination ID. Then, the game apparatus 1 determines whether or not the game start response frame is received from all guest apparatuses belonging to the MY group (step S17). The game apparatus 1 repeats the process at step S17 until the game start response frame is received from all guest apparatuses. In the case where the game start response frame is received from all guest apparatuses, the game apparatus 1 starts a communication game as a host apparatus in the MY group, and ends grouping among the game apparatuses 1. Note that, in the present example, a host apparatus and a guest apparatus in the grouping process correspond to a host apparatus and a guest apparatus in the game process, respectively. However, a host apparatus in the game process may be separately selected. Also, a game which does not require a host apparatus in the game process may be adopted.

As such, according to the game system and the game apparatus of the illustrative embodiments, it is possible to form a desired group by determining a group to enter in consideration of group information provided for each game apparatus, and execute a multiplayer game. For example, in the case where a second group to which three game apparatuses belong is present in the neighborhood of a first group to which two game apparatuses belong, such a situation is notified to a player. Thus, the player belonging to the first group can change, if desired, his/her group to the second group to enjoy a multiplayer game in a group consisting of more players (i.e., four players). As a result, one game apparatus is left in the first group. However, the presence of the second group is notified to the game apparatus in the first group, and the game apparatus can, if desired, enter the second group to enjoy the multiplayer game in a group of five players. As described above, a group to enter is determined based on a request from each player, and a grouping situation varies constantly. However, information on the changed group is continuously notified to the player, and the player can further change the group to enter based on such information. Thus, it is possible to increase the possibility that each player can form a desired group.

While the invention has been described in detail, the foregoing description is in all aspects illustrative and not restrictive. It is understood that numerous other modifications and variations can be devised without departing from the scope of the invention.

What is claimed is:

1. A game system including a plurality of game apparatus which execute a multiplayer game by directly exchanging data therebetween by using wireless communication, wherein each game apparatus comprises:
   a display;
   a wireless communicator configured for short distance wireless communication which directly transmits and receives data to and from at least one other game apparatus;
   group setting programmed logic circuitry which sets a game apparatus group, to which a first of the plurality of game apparatuses belongs, by exchanging group formation data with at least a second game apparatus via the wireless communicator, wherein a game apparatus group includes all apparatuses communicating to play the same instance of a game, wherein at least the first game apparatus includes group information transmission programmed logic circuitry which transmits group information on group formation of the game apparatus group, to which the first game apparatus belongs, with other game apparatuses via the wireless communicator;
   group information receiving programmed logic circuitry to receive group information on group formation of a second game apparatus group to which the game apparatus receiving the information does not belong, when the game apparatus receiving the information belongs to a first game apparatus group;
   display control programmed logic circuitry configured to display at least information on group formation of each of the second game apparatus groups on the display in accordance with the group information received by the group information receiving programmed logic circuitry;
   selection programmed logic circuitry which responds to player selection by selecting for entry any of the game apparatus groups, indicated by the information on group formation of the one or more second game apparatus groups to which the first game apparatus does not belong, displayed on the display by the display control programmed logic circuitry;
   group changing programmed logic circuitry which adds the first game apparatus to the selected second game apparatus group, according to a selection by the selection programmed logic circuitry responsive to a player selection, by exchanging the group formation data via the wireless communicator with a game apparatus belonging to the selected game apparatus group, wherein each game apparatus group includes one respective host apparatus; and
   multiplayer game execution programmed logic circuitry which executes a multiplayer game in whichever game apparatus group to which a game apparatus having the multiplayer game execution programmed logic circuitry belongs,
   wherein the group information includes identification information on all game apparatuses belonging to each said game apparatus group indicated by the group information, and
   wherein the display control programmed logic circuitry is further configured to display, as information on group formation of each said game apparatus group to which the first game apparatus does and does not belong, a makeup of each said game apparatus group comprising a list of all game apparatuses belonging thereto on the display, as well as information indicating which device is operating as the host device for the game apparatus groups.

2. The game system according to claim 1, wherein the display control programmed logic circuitry further displays, on the display, at least information on group formation of the game apparatus group to which the first game apparatus belongs, based on the group information set by the group setting programmed logic circuitry or the group changing programmed logic circuitry.

3. The game system according to claim 1, wherein the group information transmission programmed logic circuitry transmits the group information with other game apparatus at regular intervals.

4. The game system according to claim 1, wherein each game apparatus further comprises:
   entry request programmed logic circuitry which transmits an entry request via the wireless communicator to a third game apparatus belonging to the game apparatus group selected by the selection programmed logic circuitry; and
   entry response programmed logic circuitry which transmits an entry permit response to a requesting game apparatus via the wireless communicator when an entry request, which is transmitted from a requesting game apparatus to the game apparatus group to which the third game apparatus belongs, is permitted, wherein
   when the entry permit response is transmitted, the group changing programmed logic circuitry of the third game apparatus adds the game apparatus transmitting the entry request to the game apparatus group to which the third game apparatus belongs, and
   when the entry permit response is received, the group changing programmed logic circuitry of the requesting game apparatus adds the requesting game apparatus to the selected game apparatus group.

5. The game system according to claim 4, wherein
   the game apparatus group to which a plurality of game apparatus belong further includes at least one guest apparatus which corresponds to a game apparatus different from the host apparatus,
   the entry request programmed logic circuitry transmits an entry request to the host apparatus of the selected game apparatus group,
   the group changing programmed logic circuitry of the host apparatus adds the game apparatus transmitting the entry request to the game apparatus group thereof, and transmits the group information to the at least one guest apparatus belonging to the same game apparatus group, and the group changing programmed logic circuitry of the at least one guest apparatus changes the group information thereof based on the transmitted group information.

6. The game system according to claim 5, wherein transmission of the group information to the at least one other game apparatus by the group information transmission programmed logic circuitry is performed only by the game apparatus set as the host apparatus.

7. The game system according to claim 5, wherein when the at least one guest apparatus moves outside a range where wireless communication with the host apparatus is available, the host apparatus sets the game apparatus group thereof by deleting the at least one guest apparatus.

8. The game system according to claim 5, wherein when the entry permit response is received by the group changing programmed logic circuitry of the host apparatus which sent a group change request and a move to the selected game apparatus group is completed, the host apparatus transmits an entry cancel notification to all guest apparatuses belonging to the game apparatus group to which the host apparatus previously belonged.

9. The game system according to claim 4, wherein when the entry permit response is received by the group changing programmed logic circuitry of a guest apparatus which sent a group change request and a move to the selected game apparatus group is completed, the guest apparatus transmits an entry cancel notification to the host apparatus of the game apparatus group to which the guest apparatus previously belonged, and the host apparatus to which the entry cancel notification is transmitted performs entry cancellation, and transmits the changed group information to any remaining guest apparatus belonging to the same game apparatus group.

10. The game system according to claim 1, wherein the game apparatus repeats transmission of the group information by the group information transmission programmed logic circuitry, displaying of at least information on group formation of the game apparatus group to which the first game apparatus does not belong by the display control programmed logic circuitry, selection of the game apparatus group by the selection programmed logic circuitry, and changing of the game apparatus group to which the first game apparatus belongs by the group changing programmed logic circuitry, until the multiplayer game execution programmed logic circuitry starts the multiplayer game.

11. A game apparatus for executing a multiplayer game by directly exchanging data with other game apparatus by using wireless communication, comprising:

a display;

a wireless communicator configured for short distance wireless communication which directly transmits and receives data to and from at least one other game apparatus;

group setting programmed logic circuitry which sets a game apparatus group to which the game apparatus and at least one other game apparatus belong by exchanging group formation data with the at least one other game apparatus via the wireless communicator, wherein a game apparatus group includes all apparatuses communicating to play the same instance of a game;

group information transmission programmed logic circuitry which transmits group information on group formation of the game apparatus group to which the game apparatus belongs with at least one other game apparatus via the wireless communicator;

group information receiving programmed logic circuitry for receiving group information on group formation of at least one second game apparatus group to which the game apparatus receiving the group information does not belong;

display control programmed logic circuitry configured to display at least information on group formation of the each second game apparatus group, to which the game apparatus does not belong, on the display, based on the group information received by the group information receiving programmed logic circuitry;

selection programmed logic circuitry which responds to player selection by selecting for entry any of the at least one second game apparatus groups, indicated by the information on group formation of at least one second game apparatus group to which the game apparatus does not belong, displayed on the display by the display control programmed logic circuitry;

group changing programmed logic circuitry which adds the game apparatus to the selected second game apparatus group, according to a selection by the selection programmed logic circuitry responsive to player selection, by exchanging the group formation data via the wireless communicator with a game apparatus belonging to the selected game apparatus group, wherein each game apparatus group includes one respective host apparatus; and multiplayer game execution programmed logic circuitry which executes a multiplayer game in whichever game apparatus group to which a game apparatus having the multiplayer game execution programmed logic circuitry belongs, wherein the group information includes identification information on all game apparatuses belonging to each said game apparatus group indicated by the group information, and wherein the display control programmed logic circuitry is further configured to display, as information on group formation of each said game apparatus group to which the first game apparatus does and does not belong, a makeup of each said game apparatus group comprising a list of all game apparatuses belonging thereto on the display, as well as information indicating which device is operating as the host device for the game apparatus groups.

12. The game apparatus according to claim 11, wherein the display control programmed logic circuitry further displays, on the display, at least information on group formation of the game apparatus group to which the game apparatus belongs based on the group information set by the group setting programmed logic circuitry or the group changing programmed logic circuitry.

13. The game apparatus according to claim 11, wherein the group information transmission programmed logic circuitry transmits the group information with at least one other game apparatus at regular intervals.

14. The game apparatus according to claim 11, further comprising:

entry request programmed logic circuitry which transmits an entry request via the wireless communicator to a first game apparatus belonging to the game apparatus group selected by the selection programmed logic circuitry; and entry response programmed logic circuitry which transmits an entry permit response to a requesting game apparatus when the entry request, which is transmitted from requesting game apparatus to the game apparatus group to which the first game apparatus belongs, via the wireless communicator, is permitted, wherein when an entry permit response is transmitted, the group changing programmed logic circuitry of the first game apparatus adds the requesting game apparatus to the game apparatus group to which the first game apparatus belongs, and when an entry permit response is received, the group changing programmed logic circuitry of the requesting game apparatus adds the requesting game apparatus to the selected game apparatus group.

15. The game apparatus according to claim 14, wherein when the entry permit response is received by the group changing programmed logic circuitry of the game apparatuses and a move to the selected game apparatus group is completed, an entry cancel notification is transmitted to any other game apparatus belonging to the game apparatus group to which the requesting game apparatus previously belonged.

16. The game apparatus according to claim 11, wherein transmission of the group information by the group information transmission programmed logic circuitry, displaying of at least information on group formation of the game apparatus group to which the game apparatus does not belong by the display control programmed logic circuitry, selection of the game apparatus group by the selection programmed logic circuitry, and changing of the game apparatus group to which the game apparatus belongs by the group changing programmed logic circuitry are repeated until the multiplayer game execution programmed logic circuitry starts the multiplayer game.

17. A method for selectively choosing a group of opponents for a multiplayer network game, played on a first game apparatus provided with at least a display, comprising:
  (a) transmitting, from the first game apparatus, an identifying signal to at least one other game apparatus within a reception range;
  (b) receiving, on the first game apparatus, at least one identifying signal from at least one other game apparatus within a reception range;
  (c) displaying responsive to a received identifying signal, identifying information on the display, relating to at least one other game apparatus, including the group composition of each group to which the other game apparatus belongs, wherein a game apparatus group includes all apparatuses communicating to play the same instance of a game, wherein each game apparatus group includes one respective host apparatus;
  (d) selecting, based on the displayed identifying information, one or more apparatus with which gameplay is desired;
  (e) associating the first game apparatus with the selected one or more apparatus to form at least part of a game playing group;
  (f) executing a multiplayer game played between apparatus joined in a game playing group; and
  (g) displaying a list of all members of each group to which the first game apparatus currently belongs and currently does not belong, as well as information indicating which device is operating as the host device for the game apparatus groups, wherein all communications take place via short distance wireless communicators provided to the game apparatuses.

18. The method of claim 17, wherein the transmitting step (a) and the receiving step (b) occur at regular intervals.

19. The method of claim 17, wherein the associating step (e) includes:
  sending a join request to a selected one or more apparatus; and
  receiving a join response from the one or more apparatus to which the join request was sent, wherein, if the join response permits joining, the first game apparatus is associated with the selected one or more apparatus to form at least part of a game playing group.

20. The method of claim 17, wherein the associating step (e) includes:
  receiving a join request from at least one other apparatus; and
  sending a join response to the at least one apparatus from which the join request was received, wherein, if the join response permits joining, the at least one other game apparatus, to which the join response was sent, is associated with the first game apparatus to form at least part of a game playing group.

21. The method of claim 19, wherein the sending step includes:
  sending a join request to the host apparatus of a selected group, wherein a selected group further comprises at least one other apparatus, and wherein the receiving step further comprises:
  receiving a join response from the host apparatus to which the request was sent.

22. The method of claim 21, wherein if the first game apparatus receives a join response permitting joining from the host apparatus, different from the host apparatus of a group to which the first apparatus currently belongs, then first apparatus sends a group exit notification to the host apparatus of the group to which the first apparatus currently belongs.

23. The method of claim 22, wherein the host apparatus of the group to which the first apparatus currently belongs, upon receipt of a group exit notification from the first apparatus, removes the first apparatus from the group.

24. The game system according to claim 1, wherein the group information is communicated directly between a first game apparatus and the at least one second game apparatus.

25. The game apparatus according to claim 11, wherein the group information is communicated directly between the game apparatus and the other game apparatuses.

26. The method according to claim 17, wherein the group information is communicated directly between the first game apparatus and the at least one other game apparatus.

* * * * *